(12) United States Patent
Lin et al.

(10) Patent No.: US 12,153,243 B2
(45) Date of Patent: Nov. 26, 2024

(54) LIGHT SOURCE MODULE

(71) Applicant: Industrial Technology Research Institute, Hsinchu (TW)

(72) Inventors: Chun-Ting Lin, Taipei (TW); Yi-Hsiang Huang, Changhua County (TW); Hung Tsou, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 18/518,612

(22) Filed: Nov. 24, 2023

(65) Prior Publication Data

US 2024/0184033 A1    Jun. 6, 2024

Related U.S. Application Data

(60) Provisional application No. 63/428,707, filed on Nov. 29, 2022.

(51) Int. Cl.
*F21V 8/00*    (2006.01)
(52) U.S. Cl.
CPC .................................. *G02B 6/0043* (2013.01)
(58) Field of Classification Search
CPC .. G02B 6/0043; G02B 6/0053; G02B 6/0051; G02B 6/0036; G02B 6/0016
See application file for complete search history.

(56) References Cited

U.S. PATENT DOCUMENTS

| | | | |
|---|---|---|---|
| 9,329,328 B2 | 5/2016 | Chen et al. | |
| 10,761,259 B2 | 9/2020 | Tang et al. | |
| 10,883,670 B1* | 1/2021 | Liu | G02B 6/0036 |
| 2017/0003439 A1* | 1/2017 | Lee | G02B 6/0061 |
| 2019/0146140 A1* | 5/2019 | Joo | G02B 6/0051 |
| | | | 362/606 |

FOREIGN PATENT DOCUMENTS

| | | |
|---|---|---|
| CN | 103901527 | 7/2014 |
| CN | 104714269 | 6/2015 |
| CN | 105137522 | 12/2015 |
| CN | 217587655 | 10/2022 |
| TW | 200638135 | 11/2006 |
| TW | 201122666 | 7/2011 |
| TW | M613530 | 6/2021 |
| TW | I752721 | 1/2022 |
| TW | 202219565 | 5/2022 |

OTHER PUBLICATIONS

"Office Action of Taiwan Counterpart Application", issued on Oct. 1, 2024, p. 1-p. 9.

* cited by examiner

*Primary Examiner* — Karabi Guharay
(74) *Attorney, Agent, or Firm* — JCIPRNET

(57) ABSTRACT

A light source module includes a light source and a light guide plate. The light guide plate has a light entrance surface, a light exit surface, and a bottom surface. The light entrance surface faces the light source and is located between the light exit surface and the bottom surface. The bottom surface is opposite to the light exit surface and has a plurality of microstructures. The microstructures are a plurality of ridge-shaped microstructures formed in the light guide plate. Each of the microstructures includes a light-facing surface, and a first included angle between the light-facing surface and the bottom surface is 30 degrees to 70 degrees.

16 Claims, 16 Drawing Sheets

LIGHT SOURCE MODULE

CROSS-REFERENCE TO RELATED APPLICATION

This application claims the priority benefit of U.S. provisional application Ser. No. 63/428,707, filed on Nov. 29, 2022. The entirety of the above-mentioned patent application is hereby incorporated by reference herein and made a part of this specification.

TECHNICAL FIELD

The disclosure relates to an optical device and particularly to a light source module.

BACKGROUND

A light source module may typically achieve desired optical effects by employing a plurality of optical films. For instance, by installing a plurality of diffusion sheets and a plurality of prism sheets, light emitting uniformity may be enhanced, and light may be directed toward a normal direction and emitted. However, interface reflections and refractions occurring between the optical films may easily result in energy loss, leading to a decrease in light extraction efficiency.

SUMMARY

The disclosure provides a light source module which is conducive to enhancement of light extraction efficiency.

In an embodiment of the disclosure, a light source module includes a light source and a light guide plate. The light guide plate has a light entrance surface, a light exit surface, and a bottom surface. The light entrance surface faces the light source and is located between the light exit surface and the bottom surface. The bottom surface is opposite to the light exit surface and has a plurality of microstructures. The microstructures are a plurality of ridge-shaped microstructures formed in the light guide plate. Each of the microstructures includes a light-facing surface, and a first included angle between the light-facing surface and the bottom surface is 30 degrees to 70 degrees.

To make the disclosure comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
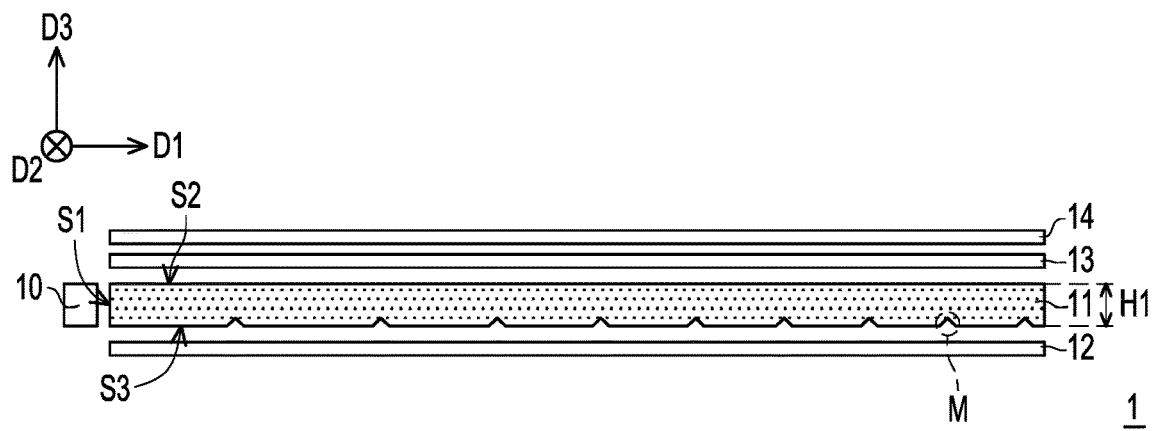
FIG. 1 and FIG. 2 are respectively a schematic cross-sectional view and a schematic top view of a light source module according to an embodiment of the disclosure.

In this disclosure, directional terminologies, such as "top," "bottom," "front," "back," "left," "right," and so on, are used with reference to the orientation of the accompanying drawings. As such, the directional terminologies are used for purposes of illustration and are in no way limiting.

In the accompanying drawings, each drawing shows the general features of the methods, structures, or materials adopted in a specific embodiment. However, the drawings should not be construed as defining or limiting the scope or nature covered by the embodiments. For instance, for clarity, the relative size, thickness, and position of each layer, region, or structure may be reduced or enlarged.

In the embodiments, the same or similar elements will be designated by the same or similar reference numerals, and descriptions thereof will be omitted. In addition, the features of different exemplary embodiments may be combined with each other when they are not in conflict, and simple equivalent changes and modifications made according to the specification or the claims still fall within the scope of the disclosure.

The terminologies such as "first" and "second" mentioned in the specification or the claims are only used to name different elements or to distinguish different embodiments or scopes and are not intended to limit the upper or lower limit of the number of the elements, nor are they intended to limit the manufacturing order or disposition order of the elements. Furthermore, the disposition of an element/film layer on (or over) another element/film layer may include the situation where the element/film layer is directly disposed on (or over) the other element/film layer and the two elements/film layers are in contact with each other, and the situation where the element/film layer is indirectly disposed on (or over) the other element/film layer and one or more elements/film layers exist between two elements/film layers.

Figure 2:
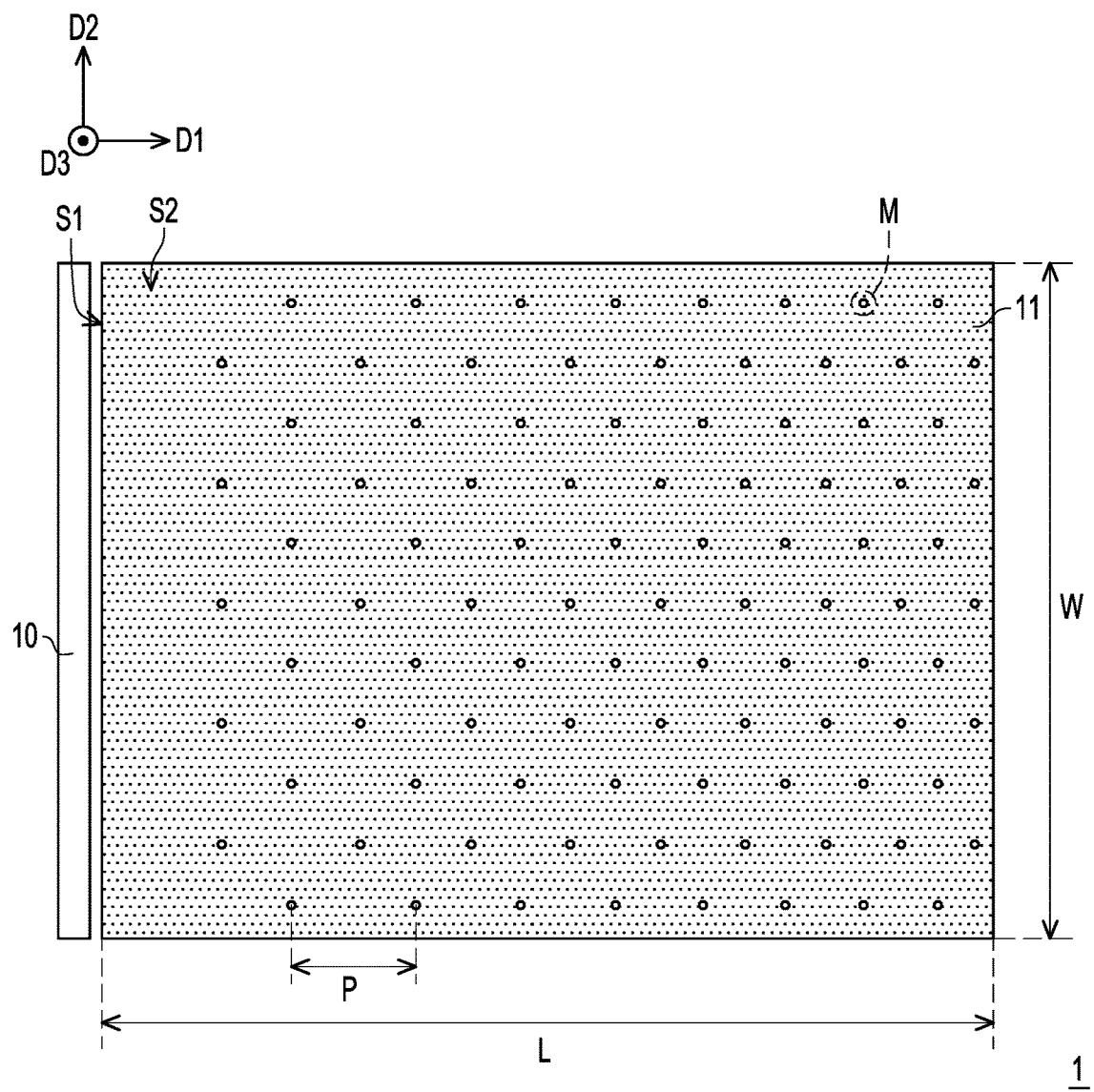
Figure 3:
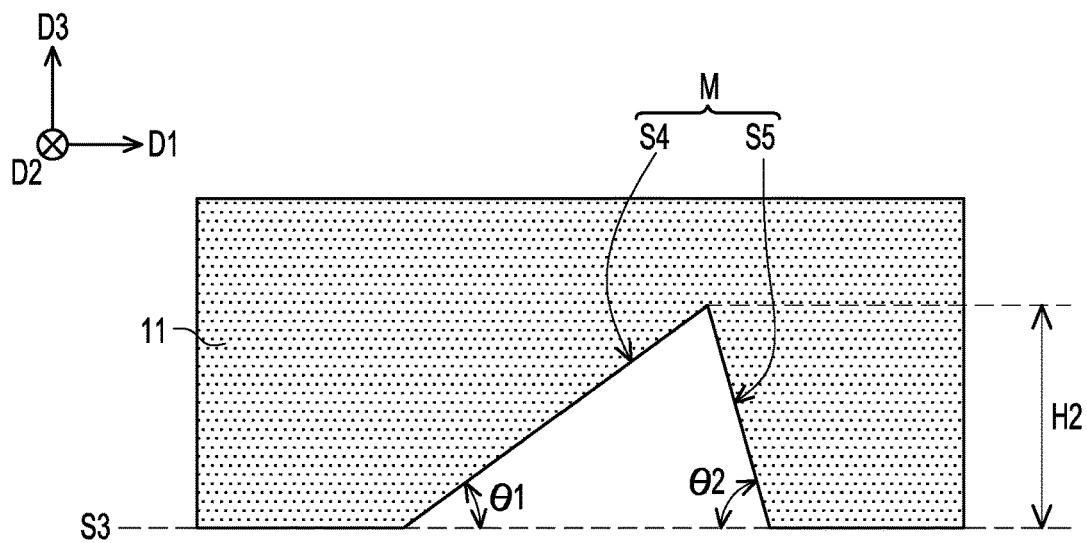
FIG. 3 to FIG. 5 are respectively a schematic cross-sectional view, a schematic top view, and a schematic three-dimensional view of a microstructure according to an embodiment of the disclosure.
Figure 4:
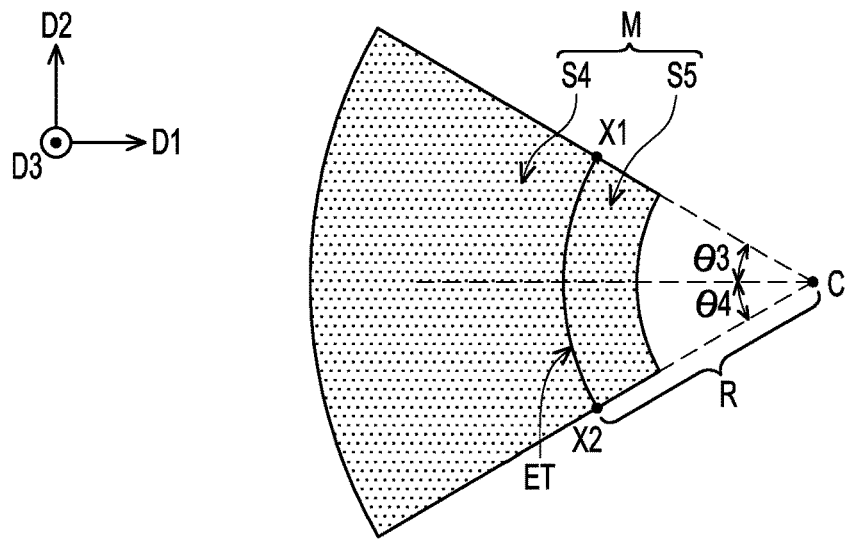
Figure 5:
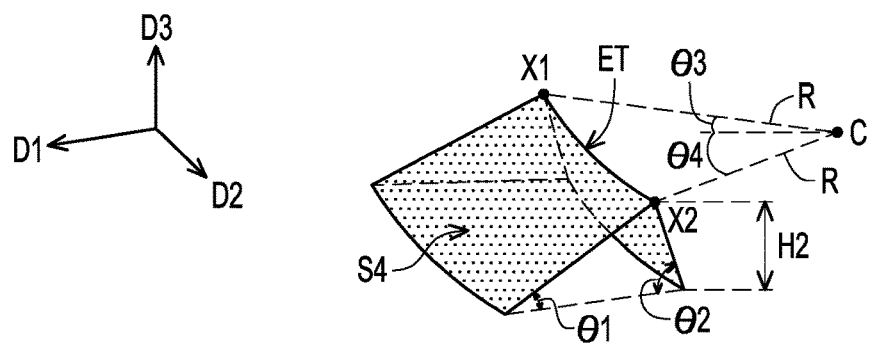

FIG. 1 and FIG. 2 are respectively a schematic cross-sectional view and a schematic top view of a light source module according to an embodiment of the disclosure, where FIG. 2 omits the illustration of a reflection sheet and a plurality of optical films to clearly show a plurality of microstructures of a light guide plate. FIG. 3 to FIG. 5 are respectively a schematic cross-sectional view, a schematic top view, and a schematic three-dimensional view of a microstructure according to an embodiment of the disclosure.

With reference to FIG. 1 and FIG. 2, a light source module 1 is, for instance, an edge-lit backlight module, and the light source module 1 may include a light source 10 and a light guide plate 11, which should however not be construed as a limitation in the disclosure. Based on different needs, the light source module 1 may further include other elements or film layers. For instance, as shown in FIG. 1, the light source module 1 may further include a reflection sheet 12 and/or a plurality of optical films (such as a prism sheet 13 and/or a diffusion sheet 14).

The light source 10 may be configured to provide light (not shown). For instance, the light source 10 may include a light-emitting diode (LED) strip or a cold cathode fluorescent lamp (CCFL). The light source 10 and the light guide plate 11 are arranged in a direction D1, and the LED strip extends in a direction D2. Although not shown in the drawings, the light source 10 may include a plurality of LEDs or a plurality of CCFLs arranged along the direction D2.

The light guide plate 11 may be configured to convert a strip-type light source into a planar light source and direct light toward a normal direction (such as a direction D3) and emit the light from the light guide plate 11. For instance, a material of the light guide plate 11 may include a translucent material, such as glass or plastic, which should however not be construed as a limitation in the disclosure. In some embodiments, a refractive index n of the light guide plate 11 may be 1.4 to 1.7, i.e., $1.4 \leq n \leq 1.7$, which should however not be construed as a limitation in the disclosure. In some embodiments, a thickness H1 of the light guide plate 11 may be greater than 0 and not exceed 0.7 mm, i.e., $0 < H1 \leq 0.7$ mm, which should however not be construed as a limitation in the disclosure. In some embodiments, the light guide plate 11 may be a rectangular light guide plate, and a length L of the light guide plate 11 in the direction D1 may be different from a width W of the light guide plate 11 in the direction D2.

The light guide plate 11 may have a light entrance surface S1, a light exit surface S2, and a bottom surface S3. The light entrance surface S1, for instance, is a side surface of the light guide plate 11 facing the light source 10 and is located between the light exit surface S2 and the bottom surface S3. In detail, the light guide plate 11 may have a plurality of side surfaces, such as four side surfaces. Given that the light source has a single-sided light entrance, one of the four sides serves as the light entrance surface; given that the light source has a double-sided light entrance, two of the four sides serve as the light entrance surfaces; given that the light source has a four-sided light entrance, four sides may serve as the light entrance surfaces. The light emitted by the light source 10 may enter the light guide plate 11 through the light entrance surface S1 of the light guide plate 11, and the light entering the light guide plate 11 may be transmitted in a direction away from the light source 10 (such as the direction D1) through total internal reflection (TIR).

The light exit surface S2 is, for instance, a top surface of the light guide plate 11. The bottom surface S3 is opposite to the light exit surface S2 and has a plurality of microstructures M. The microstructures M are configured to disrupt the TIR and allow light to be emitted from the light exit surface S2 of the light guide plate 11. In some embodiments, a height H2 (with reference to FIG. 3 or FIG. 5) of the microstructures M may be 3 μm to 15 μm, i.e., 3 μm≤H2≤15 μm, which should however not be construed as a limitation in the disclosure.

The microstructures M are, for instance, a plurality of ridge-shaped microstructures formed in the light guide plate 11. In some embodiments, the light guide plate 11 may be a single material layer (such as the above-mentioned glass layer or plastic layer), and the microstructures may be formed at the bottom of the single material layer through molding, etching, or other patterning methods. In other embodiments, although not shown in the drawings, the light guide plate 11 may be a composite material layer, e.g., a stacked layer of a light guide layer (such as the above-mentioned glass layer or plastic layer) and a microstructure layer, where a material of the microstructure layer may include photoresist, a UV adhesive, or other photo-curable adhesives, and the microstructure material layer may be formed at a bottom of the light guide layer by, for instance, performing a coating method and then performing a photo-curing process. As shown in FIG. 3 to FIG. 5, the microstructure M may include a light-facing surface S4. The light-facing surface S4 refers to a surface of the microstructure M facing the light source 10. Given that the light source has a single-sided light entrance, the microstructure may include, for instance, one light-facing surface; given that the light source has a double-sided light entrance, the microstructure may include, for instance, two light-facing surfaces; given that the light source has a four-sided light entrance, the microstructure may include, for instance, a plurality of light-facing surfaces or a ring-shaped light-facing surface.

A first included angle θ1 between the light-facing surface S4 and the bottom surface S3 is 30 to 70 degrees, i.e., $30° \leq θ1 \leq 70°$. The first included angle θ1 is an acute angle between a plane where the bottom surface S3 of the light guide plate 11 is located (indicated by the dashed line in FIG. 3) and the light-facing surface S4. If the first included angle θ1 is less than 30 degrees, the light tends to diverge, which may easily lead to a decrease in a light extraction rate in the normal direction (such as the direction D3) of the light guide plate 11; if the first included angle θ1 is greater than 70 degrees, the light may easily penetrate the light-facing surface S4 instead of being reflected by the light-facing surface S4, thus resulting in a decrease in the amount of light output from the light exit surface S2. Through the design of the ridge-shaped microstructures and the first included angle θ1, light may be directed toward the normal direction (such as the direction D3) of the light guide plate 11 and emitted, which may help reduce the overall number of prism sheets. By reducing the number of the prism sheets, light loss resulting from interface reflections and/or refractions between the optical films may be reduced, which is conducive to enhancement of light extraction efficiency. By reducing the number of the optical films required by the light source module 1, the cost of the optical films and the carbon emissions of the light source module 1 may be reduced. In addition, with the enhancement of the light extraction efficiency, the number of light-emitting elements (such as the LEDs) may be reduced.

According to different requirements, the light-facing surface S4 may be a flat surface, a curved surface, a rough surface, or a combination of the above. The rough surface may be a surface with a diffractive and/or refractive composite structure. The diffractive and/or refractive composite structure has integrated refraction and diffraction characteristics and may achieve specific performance and functions, such as eliminating parallax, enhancing a viewing angle, and/or reducing size, etc. The shape, the arrangement cycle, the structural curvature, the turning angle, the degree of inclination, and other features of the diffractive and/or refractive composite structure may be on a near-wavelength scale (for instance, about 1 μm).

In some embodiments, as shown in FIG. 4 and FIG. 5, an upper edge ET of the light-facing surface S4 is an arc with a single radius of curvature R. The radius of curvature R may be designed according to actual needs (e.g., according to the size of the light guide plate 11), and no further restrictions are imposed herein. In the top view of the light source module 1 (as shown in FIG. 4), a third included angle θ3 exists between a connection line connecting a center C of the arc (the center of the radius of curvature R) and a first end X1 of the arc and the normal direction of the light entrance surface (such as the direction D1), and a fourth included angle θ4 exists between a connection line connecting the center C and a second end X2 of the arc and the normal direction (such as the direction D1). The third included angle θ3 and the fourth included angle θ4 are, for instance, 10 degrees to 50 degrees, and the third included angle θ3 and the fourth included angle θ4 may be the same or different. The design of the third included angle θ3 and the fourth included angle θ4 may change the area occupied by the light-facing surface S4, thereby controlling the amount of the output light of the microstructures M.

In some embodiments, all the microstructures M may have the same third included angle θ3 and the same fourth included angle θ4, which should however not be construed as a limitation in the disclosure. In other embodiments, the third included angle θ3 and the fourth included angle θ4 may increase in a direction away from the light source 10 (such as the direction D1); that is, the third included angle θ3 and the fourth included angle θ4 of the microstructures M away from the light source 10 may be greater than the third included angle θ3 and the fourth included angle θ4 of the microstructures M close to the light source 10, thereby increasing the amount of the output light in the region away from the light source 10 and accordingly enhancing the light emitting uniformity in the direction D1.

Given that the light source has a single-sided light entrance, the microstructures M may further include a backlight surface S5 opposite to the light-facing surface S4. In some embodiments, as shown in FIG. 3, the second included angle θ2 between the backlight surface S5 and the bottom surface S3 may be 40 degrees to 90 degrees, i.e., 40°≤θ2≤90°. The second included angle θ2 is an acute angle included between a plane where the bottom surface S3 of the light guide plate 11 is located (indicated by the dashed line in FIG. 3) and the backlight surface S5. The design of the second included angle θ2 is conducive to the manufacture of the light guide plate 11 and/or enhancement of the light extraction efficiency.

According to different requirements, the backlight surface S5 may be a flat surface, a curved surface, a rough surface, or a combination of the above. In some embodiments, as shown in FIG. 3 to FIG. 5, the backlight surface S5 may be connected to the light-facing surface S4, which should however not be construed as a limitation in the disclosure. In other embodiments, the microstructures M may further include a connection surface (not shown) connecting the backlight surface S5 and the light-facing surface S4, and the connection surface may be a flat surface, which should however not be construed as a limitation in the disclosure.

Since the energy of light decreases with the increase of the length of the light path, the closer to the light source 10, the stronger the energy of light, and the farther away from the light source 10, the weaker the energy of light. In some embodiments, as shown in FIG. 2, by adjusting pitches P of the microstructures M, for instance, by decreasing the pitches P of the microstructures M in the direction away from the light source 10 (such as the direction D1), the amount of the output light in different regions (such as the region near the light source 10 and the region far from the light source 10) may be adjusted, thereby improving the light emitting uniformity in the direction D1. For instance, coordinates of the microstructures M in the direction D1 may be expressed as:

$$x_i = \sum_i i^\alpha \cdot \Delta x$$

where i equals 1 to N, N is the total number of the microstructures M in the direction D1, α is an exponential coefficient, and Δx is a constant. In addition, coordinates of the microstructures M in the direction D2 may be represented as:

$$y_i = i \cdot \Delta y$$

where Δy is a constant. In the above equation, α, Δx, and Δy may be designed according to actual needs, and no further restrictions are imposed herein. Alternatively, as mentioned above, the light emitting uniformity in the direction D1 may be improved by changing the third included angle θ3 and the fourth included angle θ4. Alternatively, the light emitting uniformity in the direction D1 may be improved by the design of the pitches P, the third included angle θ3, and the fourth included angle θ4. In some embodiments, as shown in FIG. 2, the arrangement manner of the microstructures M may be adjusted, for instance, by alternately arranging the microstructures M in an extension direction (such as the direction D2) of the light source 10. For instance, the adjacent microstructures M in the direction D1 may be translated by a distance of "Δy divided by 2" along the direction D2, which should however not be construed as a limitation in the disclosure. Through any of the above designs, the light emitting uniformity may be improved, thereby reducing the overall number of the diffusion sheets and improving the light extraction efficiency.

With reference back to FIG. 1, the reflection sheet 12 is optionally disposed below the bottom surface S3 as needed. The reflection sheet 12 may serve to reflect the light emitted from the bottom surface S3 back into the light guide plate 11, which is conducive to improvement of a light utilization rate. For instance, the reflection sheet 12 may include a white reflection sheet or a metal reflection sheet, which should however not be construed as a limitation in the disclosure.

The optical films (such as the prism sheet 13 and/or the diffusion sheet 14) are disposed above the light exit surface S2, where the number of the prism sheets (such as the prism sheet 13) in the optical films is, for instance, one, and the number of the diffusion sheets (such as the diffusion sheet 14) in the optical films is, for instance, one, which should however not be construed as a limitation in the disclosure. For instance, in other embodiments, the number of the diffusion sheets in the optical films may be two.

Figure 6:
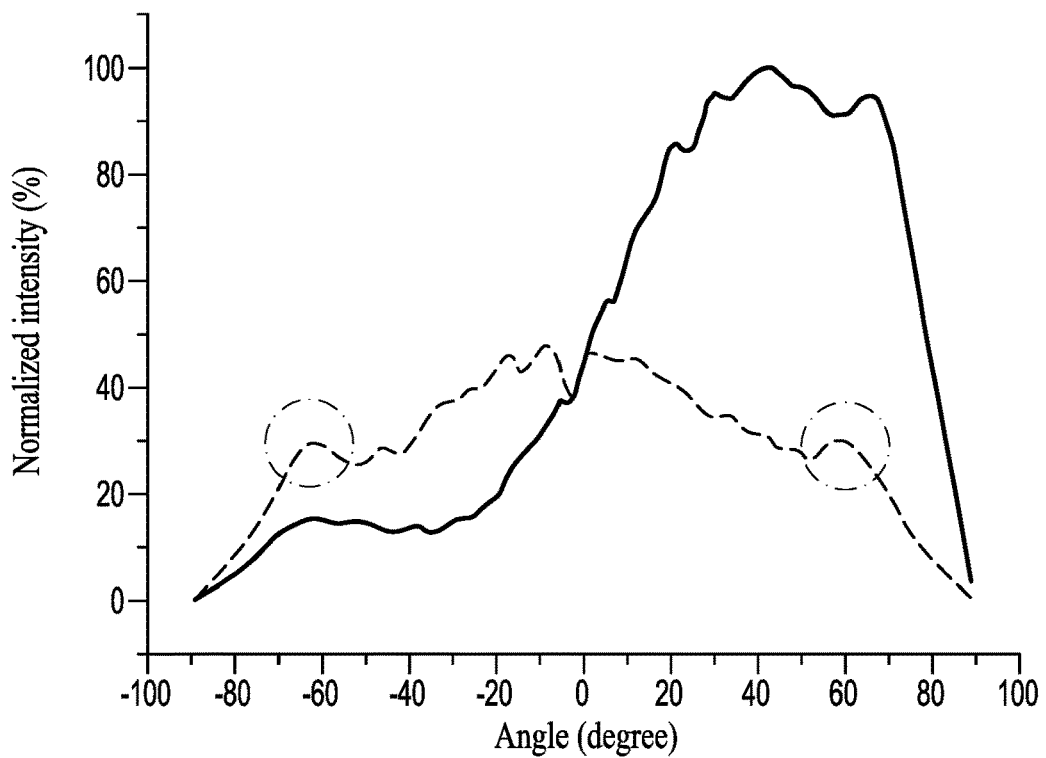
FIG. 6 and FIG. 7 are respectively a light intensity distribution diagram and a light extraction illuminance distribution diagram of a light guide plate according to a comparative example.
Figure 7:
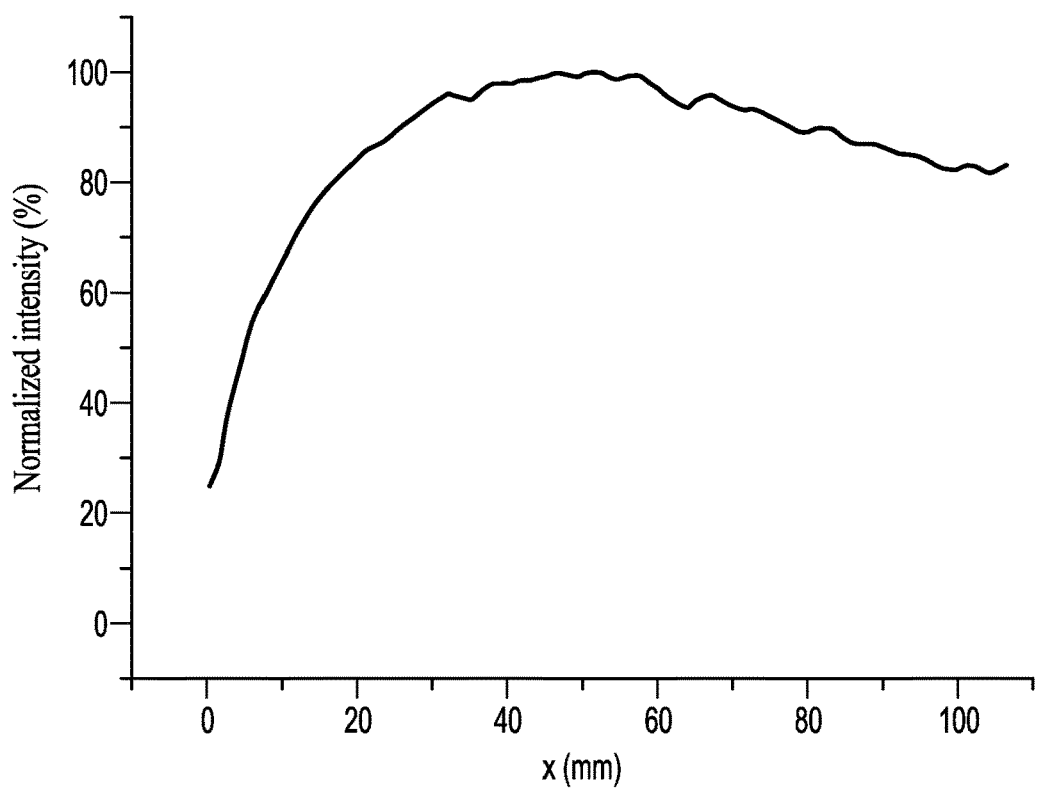
Figure 8:
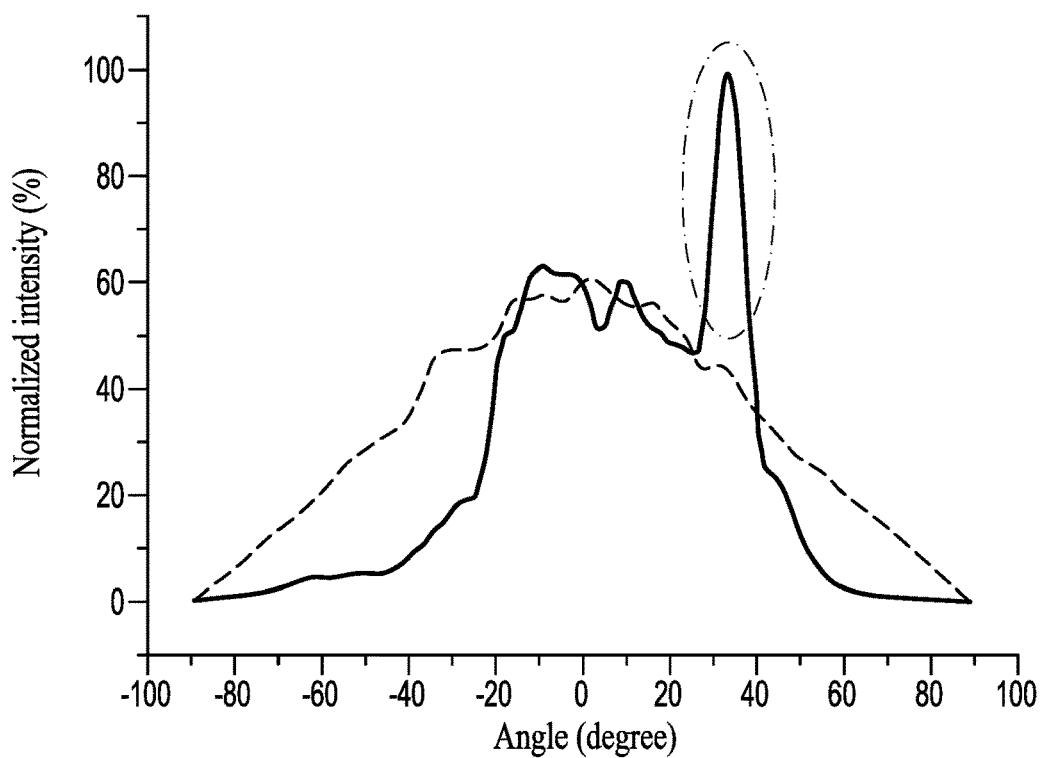
FIG. 8 and FIG. 9 are respectively a light intensity distribution diagram and a light extraction illuminance distribution diagram of a light guide plate according to a first embodiment of the disclosure.
Figure 9:
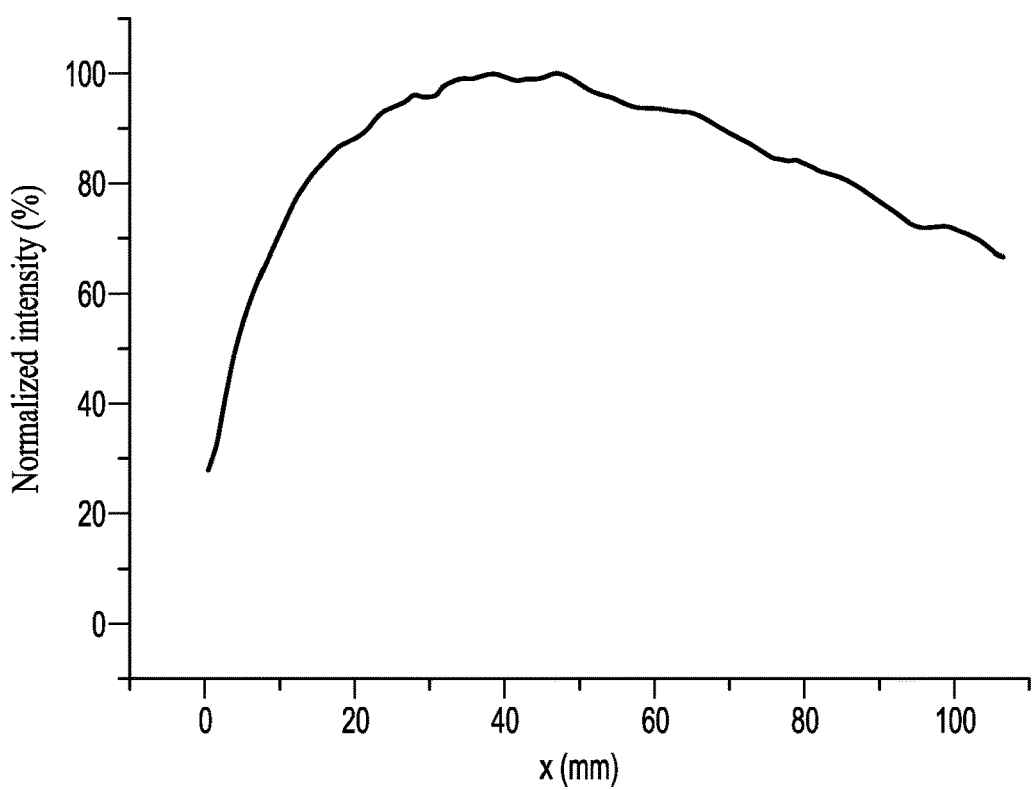

FIG. 6 and FIG. 7 are respectively a light intensity distribution diagram and a light extraction illuminance distribution diagram of a light guide plate according to a comparative example. FIG. 8 and FIG. 9 are respectively a light intensity distribution diagram and a light extraction illuminance distribution diagram of a light guide plate according to a first embodiment of the disclosure. In FIG. 6 and FIG. 8, the solid line represents the light intensity distribution in the direction D1, and the dashed line represents the light intensity distribution in the direction D2.

In the light guide plate provided in the comparative example and the light guide plate provided in the first embodiment, the refractive index of the two light guide plates may be set as 1.586, a width (such as the width W in FIG. 2) of each of the two light guide plates is 142 mm, a length (such as the length L in FIG. 2) of each of the two light guide plates is 107 mm, a thickness (such as the thickness H1 in FIG. 1) of each of the two light guide plates is 0.5 mm, and the microstructures of the two light guide plates are alternately arranged as shown in FIG. 2. The main difference between the comparative example and the first embodiment lies in the design of the microstructures. In the comparative example, each microstructure has a hemispherical (not limited to half of a sphere) surface, where a radius of curvature of each microstructure is, for instance, 10 μm, and the height of each microstructure may be 4 μm. In the first embodiment, each microstructure adopts the design as shown in FIG. 3 to FIG. 5, where the relevant parameters of each microstructure are as shown in the following table.

| | |
|---|---|
| H2 | 6 μm |
| θ1 | 50° |
| θ2 | 50° |
| R | 10 μm |
| θ3 | 30° |
| θ4 | 30° |
| α | 0.7 |
| Δx | 270 μm |
| Δy | 270 μm |

In the comparative example, as shown in FIG. 6, a peak light intensity in the direction D1 (see the solid line) deviates from the 0-degree angle (the normal), and thus at least one prism sheet is needed to calibrate the peak light intensity in the direction D1. In addition, the light intensity distribution in the direction D2 (see the dashed line) has two small peaks at the angle of ±60° (see the circles marked by the dotted chain lines), and thus at least one prism sheet is needed for calibration or elimination. Besides, as shown in FIG. 7, the light extraction efficiency provided in the comparative example is about 49.4%, and the light emitting uniformity is about 72.6%.

In the first embodiment, as shown in FIG. 8, the peak light intensity in the direction D1 (see the solid line) may approach 0 degree, but there is another peak at about 40 degrees (see the circle marked by the dotted chain line), and if deemed necessary, at least one prism sheet may be selectively configured to calibrate or eliminate the another peak, or the use of the prism sheet may be omitted; alternatively, a diffusion sheet may be employed for improvement. On the other hand, the peak light intensity in the direction D2 (see the dashed line) is concentrated at the 0-degree angle, and therefore, as compared to the comparative example, in the first embodiment, at least one prism sheet may be omitted. Besides, as shown in FIG. 9, the light extraction efficiency provided in the first embodiment is about 54.3%, and the light emitting uniformity is about 76.1%.

Figure 10:
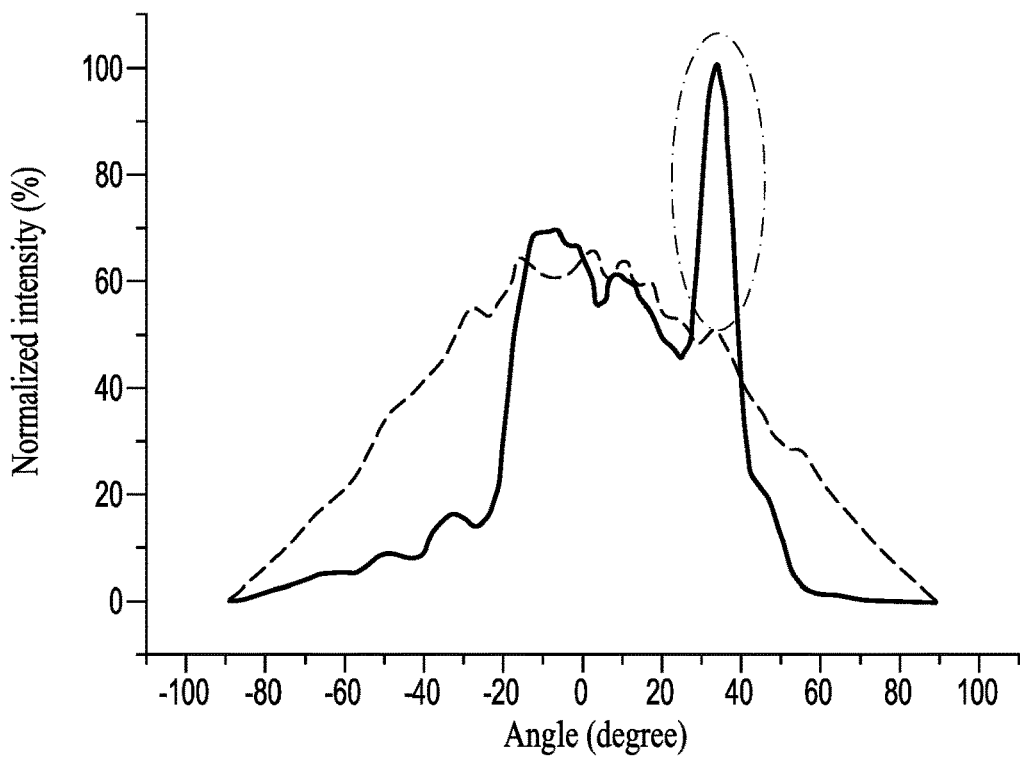
FIG. 10 and FIG. 11 are respectively a light intensity distribution diagram and a light extraction illuminance distribution diagram of a light guide plate according to a second embodiment of the disclosure.
Figure 11:
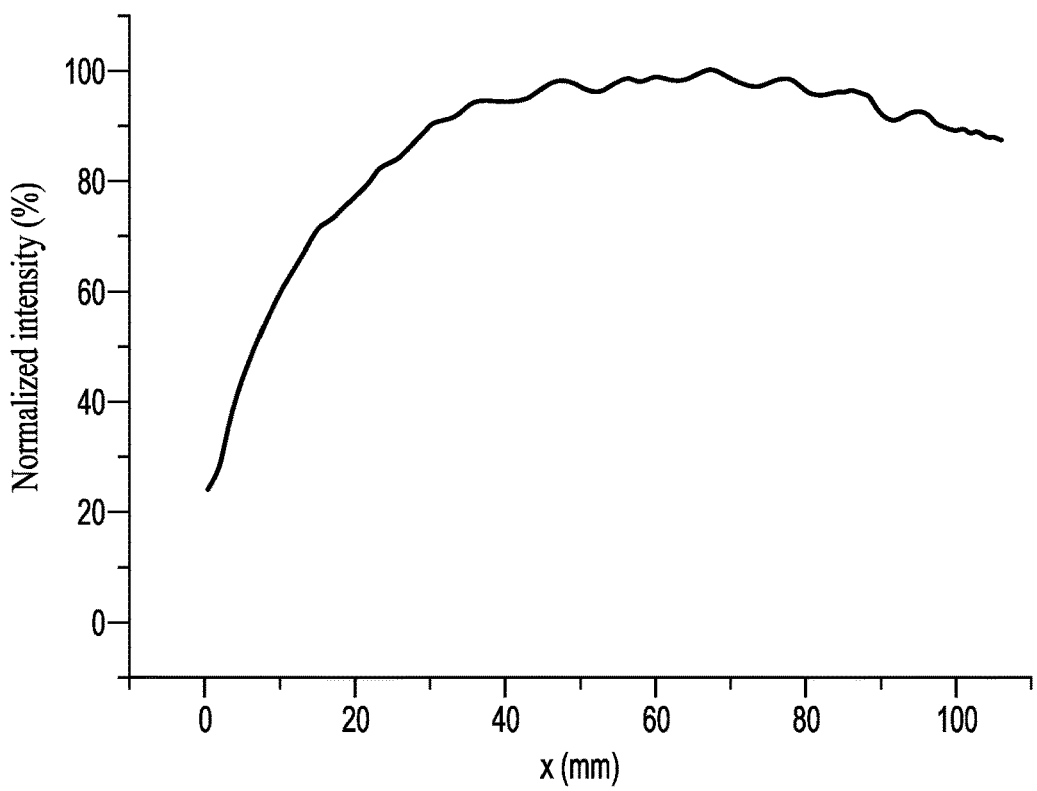

FIG. 10 and FIG. 11 are respectively a light intensity distribution diagram and a light extraction illuminance distribution diagram of a light guide plate according to a second embodiment of the disclosure. In the second embodiment, θ3=15° and θ4=15°.

In the second embodiment, as shown in FIG. 10, the peak light intensity in the direction D1 (see solid line) approaches 0 degree, but there is another peak at about 40 degrees (see the circle marked by the dotted chain line), and if deemed necessary, at least one prism sheet may be selectively configured to calibrate or eliminate the another peak, or the use of the prism sheet may be omitted; alternatively, a diffusion sheet may be employed for improvement. On the other hand, the peak light intensity in the direction D2 (see the dashed line) is at the 0-degree angle, and therefore as compared to the comparative example, in the second embodiment, at least one prism sheet may be omitted. Besides, as shown in FIG. 11, the light extraction efficiency provided in the second embodiment is about 39.1%, and the light emitting uniformity is about 64.6%. In the present embodiment, the light extraction efficiency may be further improved by, for instance, reducing the pitches P of the microstructures.

Figure 12:
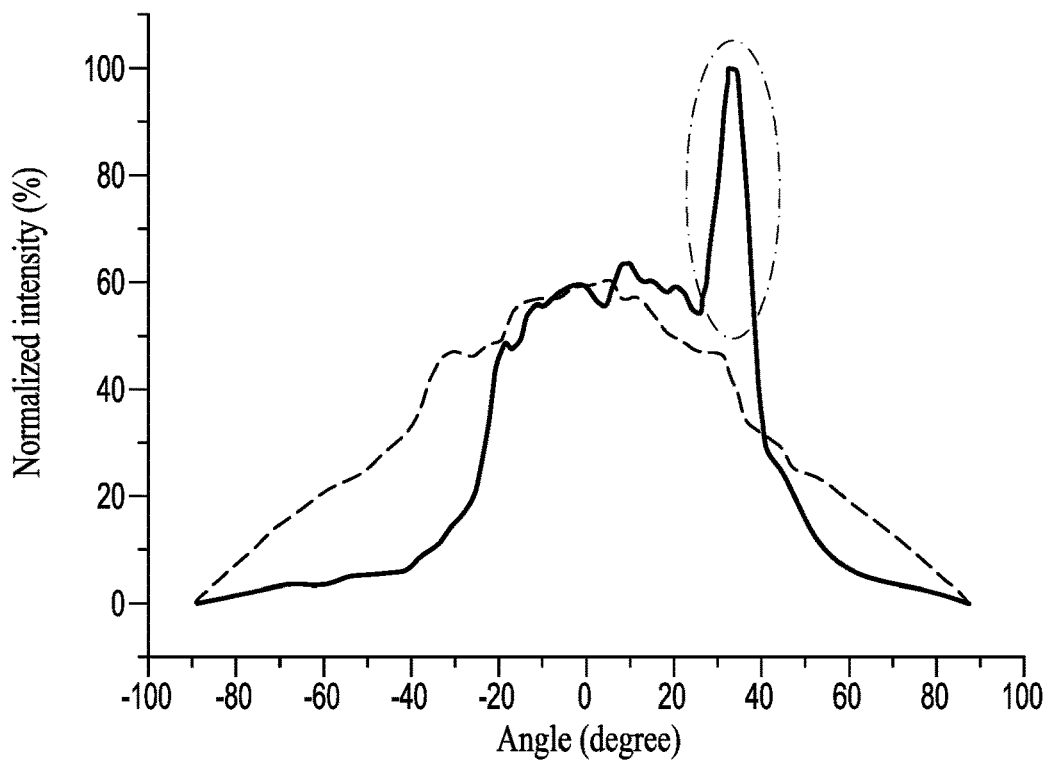
FIG. 12 and FIG. 13 are respectively a light intensity distribution diagram and a light extraction illuminance distribution diagram of a light guide plate according to a third embodiment of the disclosure.
Figure 13:
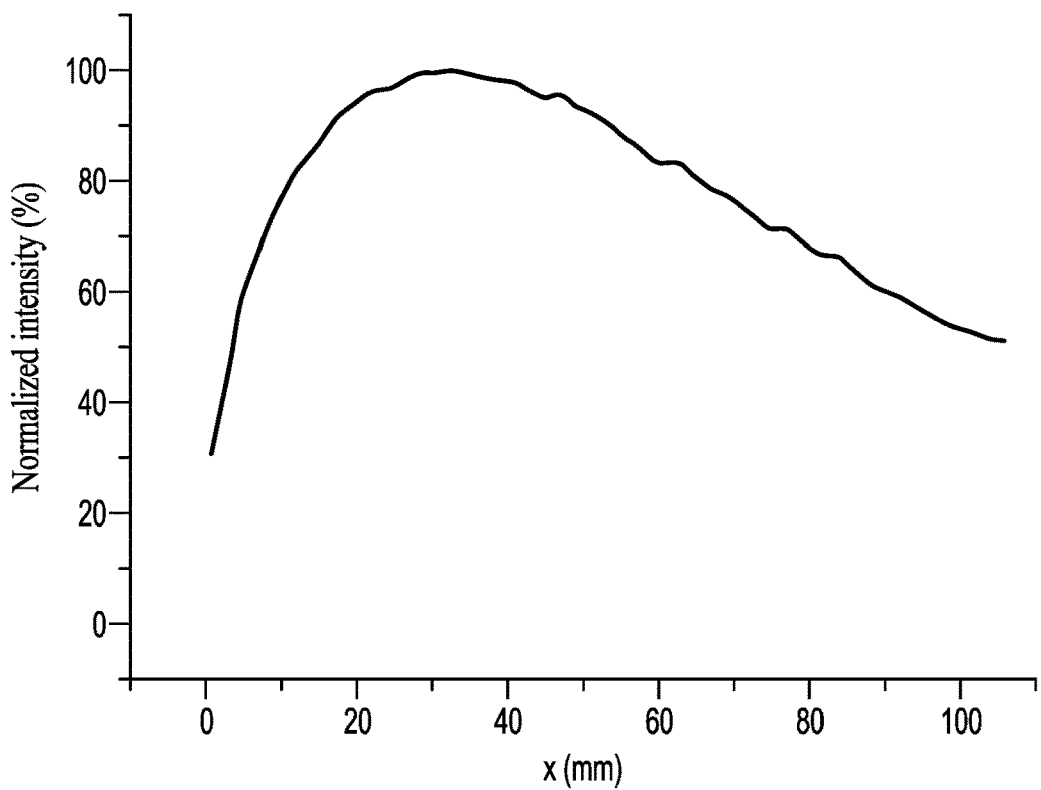

FIG. 12 and FIG. 13 are respectively a light intensity distribution diagram and a light extraction illuminance distribution diagram of a light guide plate according to a third embodiment of the disclosure. In the third embodiment, θ3-45° and θ4=45°.

In the third embodiment, as shown in FIG. 12, the peak light intensity in the direction D1 (see the solid line) approaches 0 degree, but there is another peak at about 40 degrees (see the circle marked by the dotted chain line), and if deemed necessary, at least one prism sheet may be selectively configured to calibrate or eliminate the another peak, or the use of the prism sheet may be omitted; alternatively, a diffusion sheet may be employed for improvement. On the other hand, the peak light intensity in the direction D2 (see the dashed line) is at the 0-degree angle, and therefore, as compared to the comparative example, in the third embodiment, at least one prism sheet may be omitted. Besides, as shown in FIG. 13, the light extraction efficiency provided in the third embodiment is about 59.6%, and the light emitting uniformity is about 63.4%. In the present embodiment, the light emitting uniformity may be further improved by, for instance, adjusting the pitches P the microstructures to be non-equidistant.

Figure 14:
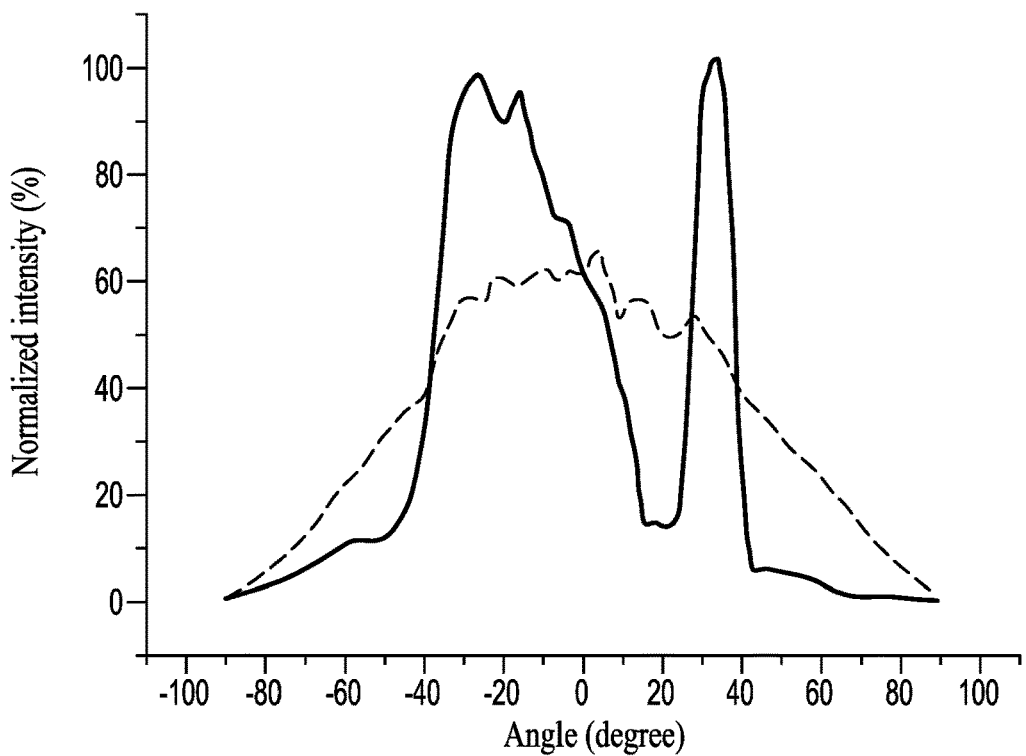
FIG. 14 and FIG. 15 are respectively a light intensity distribution diagram and a light extraction illuminance distribution diagram of a light guide plate according to a fourth embodiment of the disclosure.
Figure 15:
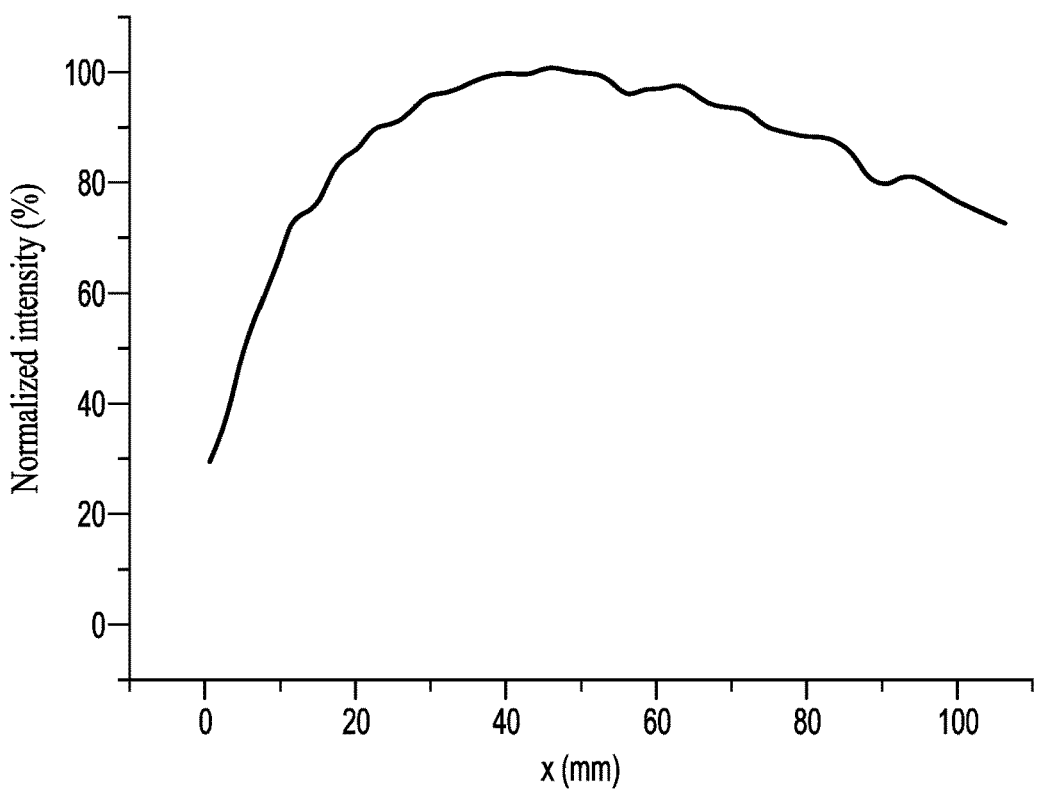

FIG. 14 and FIG. 15 are respectively a light intensity distribution diagram and a light extraction illuminance distribution diagram of a light guide plate according to a fourth embodiment of the disclosure. In the fourth embodiment, θ1-60° and θ2-60°.

In the fourth embodiment, as shown in FIG. 14, the peak light intensity in the direction D1 (see the solid line) approaches ±30 degrees, and if deemed necessary, at least one prism sheet may be selectively configured to calibrate or eliminate two peaks, or the use of the prism sheet may be omitted; alternatively, a diffusion sheet may be employed for improvement. On the other hand, the peak light intensity in the direction D2 (see the dashed line) is at the 0-degree angle, and therefore, as compared to the comparative example, in the fourth embodiment, at least one prism sheet may be omitted. Besides, as shown in FIG. 15, the light extraction efficiency provided in the fourth embodiment is about 44.2%, and the light emitting uniformity is about 75.1%.

Figure 16:
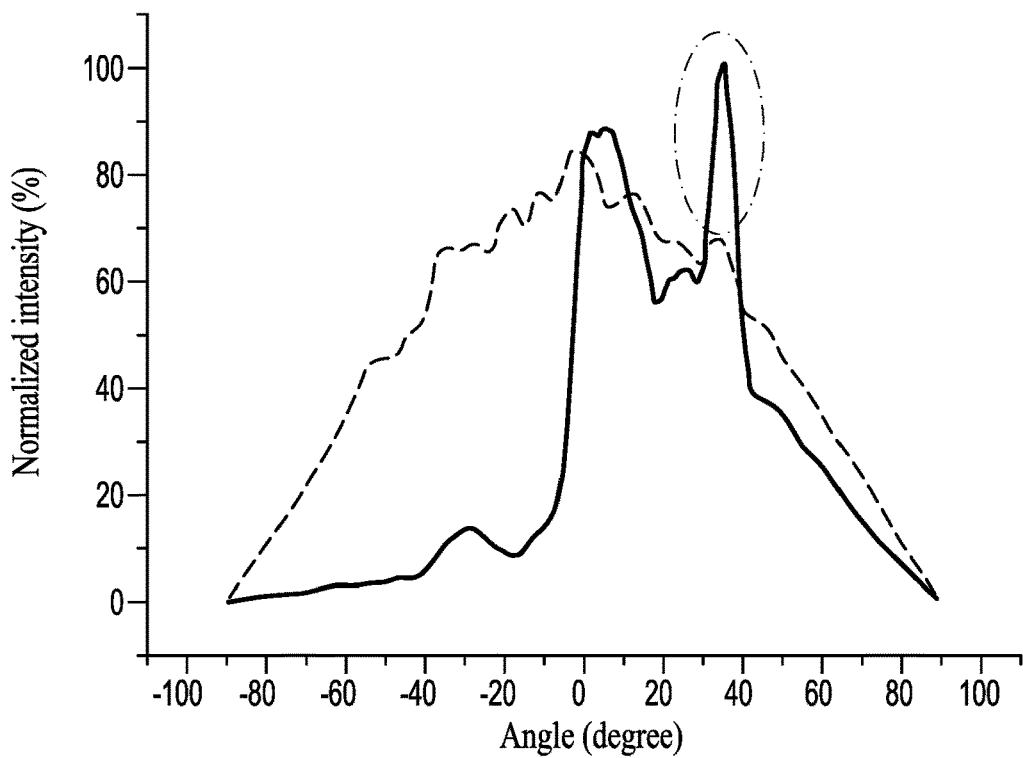
FIG. 16 and FIG. 17 are respectively a light intensity distribution diagram and a light extraction illuminance distribution diagram of a light guide plate according to a fifth embodiment of the disclosure.
Figure 17:
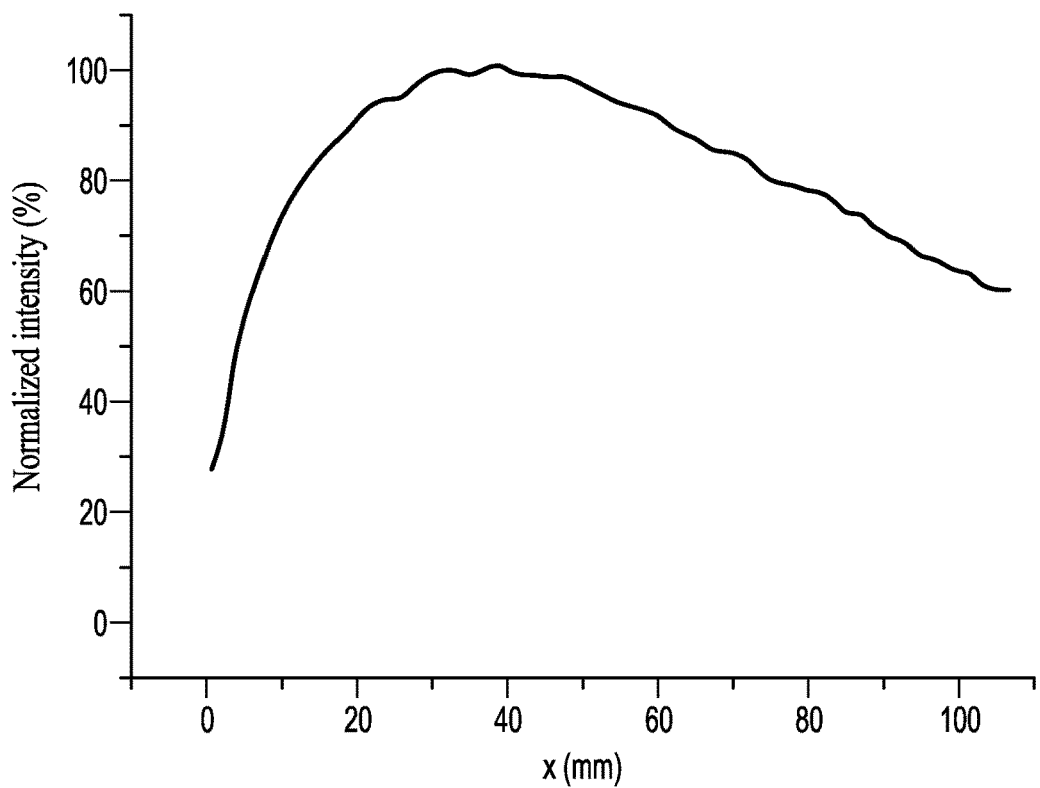

FIG. 16 and FIG. 17 are respectively a light intensity distribution diagram and a light extraction illuminance distribution diagram of a light guide plate according to a fifth embodiment of the disclosure. In the fifth embodiment, θ1=40° and θ2=40°.

In the fifth embodiment, as shown in FIG. 16, the peak light intensity in the direction D1 (see the solid line) approaches 0 degree, but there is another peak at about 40 degrees (see the circle marked by the dotted chain line), and if deemed necessary, at least one prism sheet may be selectively configured to calibrate or eliminate the another peak, or the use of the prism sheet may be omitted; alternatively, a diffusion sheet may be employed for improvement. On the other hand, the peak light intensity in the direction D2 (see the dashed line) is at the 0-degree angle, and therefore, as compared to the comparative example, in the fifth embodiment, at least one prism sheet may be omitted. Besides, as shown in FIG. 17, the light extraction efficiency provided in the fifth embodiment is about 62.7%, and the light emitting uniformity is about 70.2%.

Figure 18:
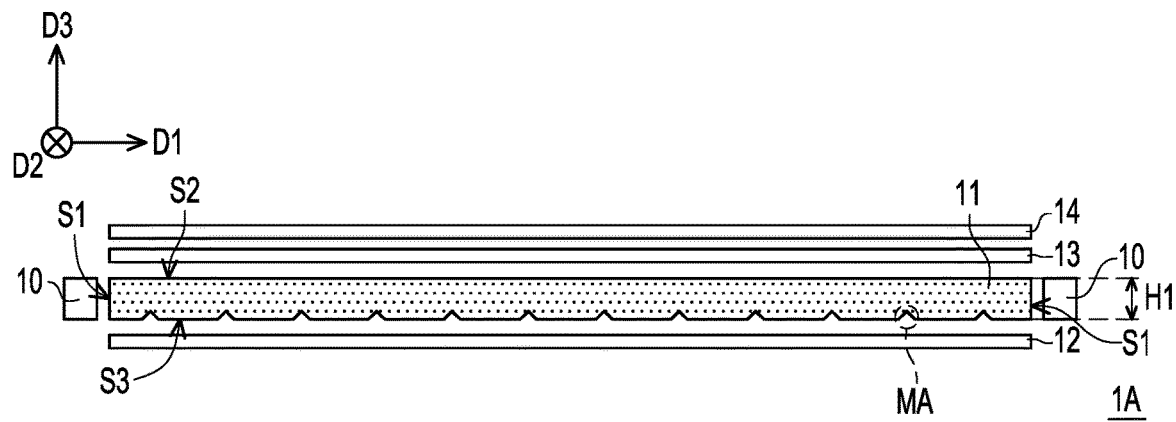
FIG. 18 and FIG. 19 are respectively a schematic cross-sectional view and a schematic top view of a light source module according to another embodiment of the disclosure.
Figure 19:
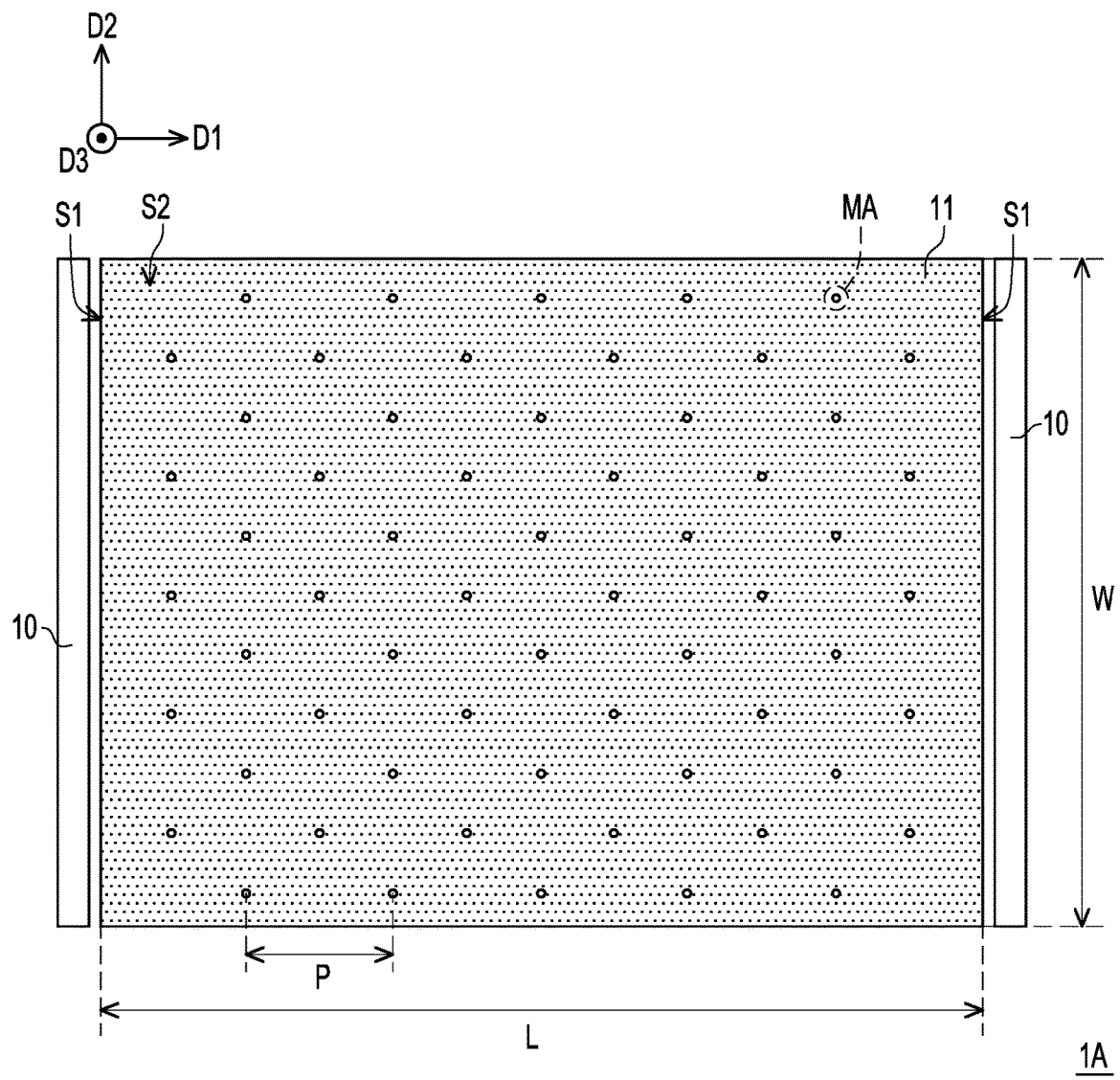
Figure 20:
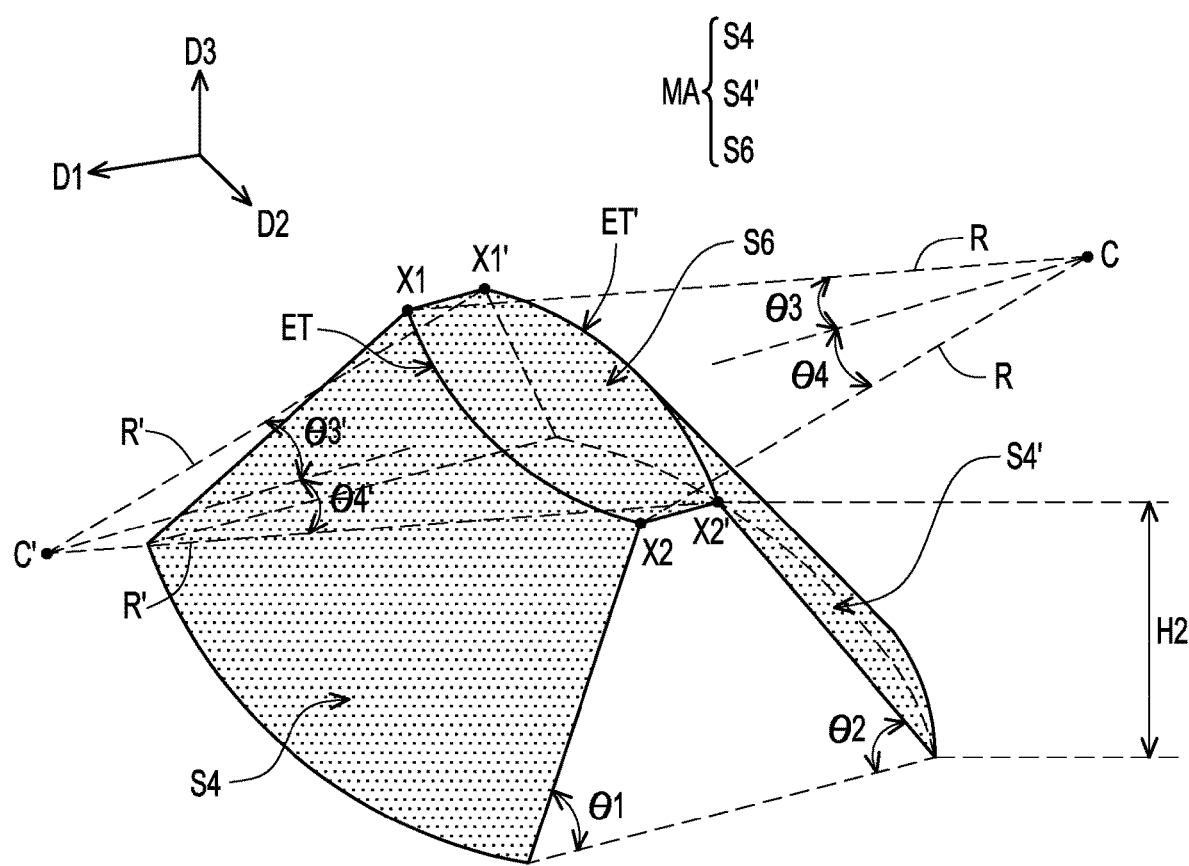
FIG. 20 is a schematic three-dimensional view of a microstructure according to another embodiment of the disclosure.

FIG. 18 and FIG. 19 are respectively a schematic cross-sectional view and a schematic top view of a light source module according to another embodiment of the disclosure. FIG. 20 is a schematic three-dimensional view of a microstructure according to another embodiment of the disclosure.

With reference to FIG. 18 to FIG. 20, in a light source module 1A, the light source 10 has a double-sided light entrance. The light guide plate 11 has two light entrance surfaces S1 that are opposite to each other. Each microstructure MA may include two light-facing surfaces (such as light-facing surfaces S4 and S4'), and each microstructure MA further includes a connection surface S6, where the light-facing surfaces S4 and S4' are respectively located on opposite sides of the connection surface S6 and face the two light entrance surfaces S1, respectively. In some embodiments, the connection surface S6 is, for instance, a flat surface, which should however not be construed as a limitation in the disclosure.

Similar to the light-facing surface S4, the light-facing surface S4' has an upper edge ET' which is an arc with a single radius of curvature R'. The radius of curvature R' may be designed according to actual needs (for instance, the size of the light guide plate 11), and no further restrictions are imposed herein. In the top view of the light source module 1A, a third included angle θ3' exists between a connection line connecting a center C' of the arc (the center of the radius of curvature R') and exists first end X1' of the arc and the normal direction of the light entrance surface (such as the direction D1), and a fourth included angle θ4' exists between a connection line connecting the center C' and a second end X2' of the arc and the normal direction (such as the direction D1). The third included angle θ3' and the fourth included angle θ4' are, for instance, 10 degrees to 50 degrees, and the third included angle θ3' and the fourth included angle θ4' may be the same or different. Through the design of the third included angle θ3' and the fourth included angle θ4', the area occupied by the light-facing surface S4' may be changed, thereby controlling the amount of the output light of the microstructures MA. In some embodiments, the third included angle θ3' may be equal to the third included angle θ3, and the fourth included angle θ4' may be equal to the fourth included angle θ4, which should however not be construed as a limitation in the disclosure. In some embodiments, the third included angle θ3, the third included angle θ3', the fourth included angle θ4, and the fourth included angle θ4' may increase in the direction away from the light source 10. For instance, in a central region of the light guide plate 11, the third included angle θ3, the third included angle θ3', the fourth included angle θ4, and the fourth included angle 84' of the microstructures MA may be smaller than those of the microstructures MA in the peripheral region of the light guide plate 11 (such as the regions on both sides of the central region). In some embodiments, as shown in FIG. 19, the microstructures MA may have the same pitch P. In addition, if deemed necessary, the microstructures may be adjusted to have different pitches P.

Figure 21:
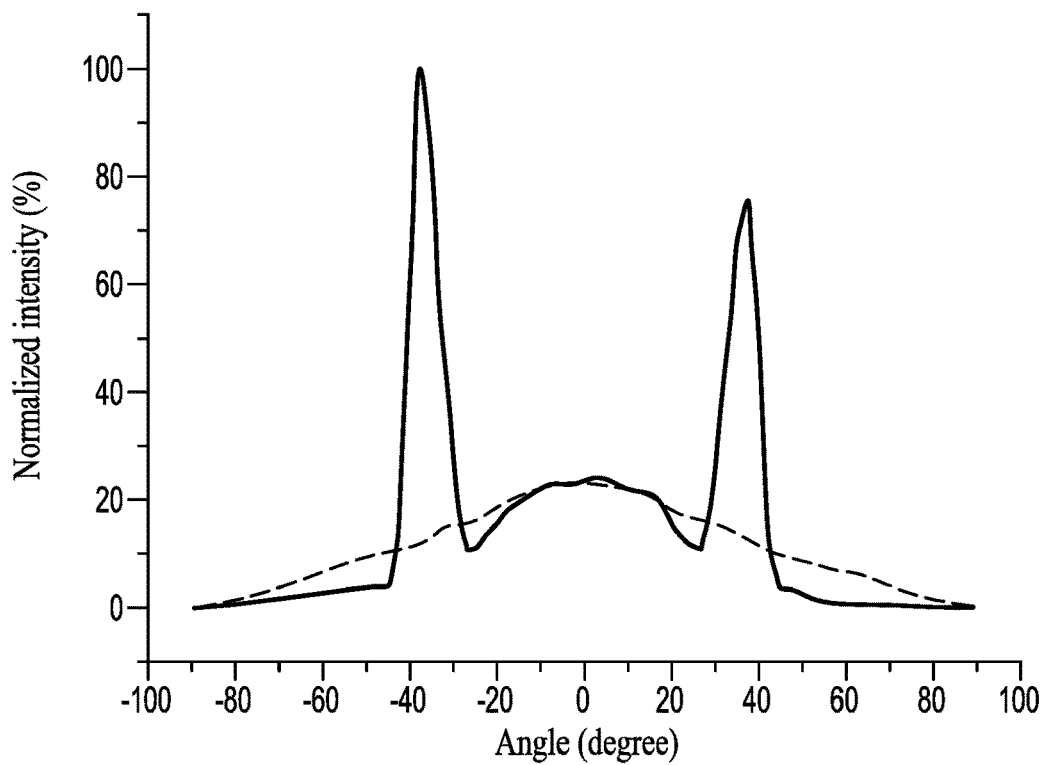
FIG. 21 and FIG. 22 are respectively a light intensity distribution diagram and a light extraction illuminance distribution diagram of a light guide plate according to a sixth embodiment of the disclosure.
Figure 22:
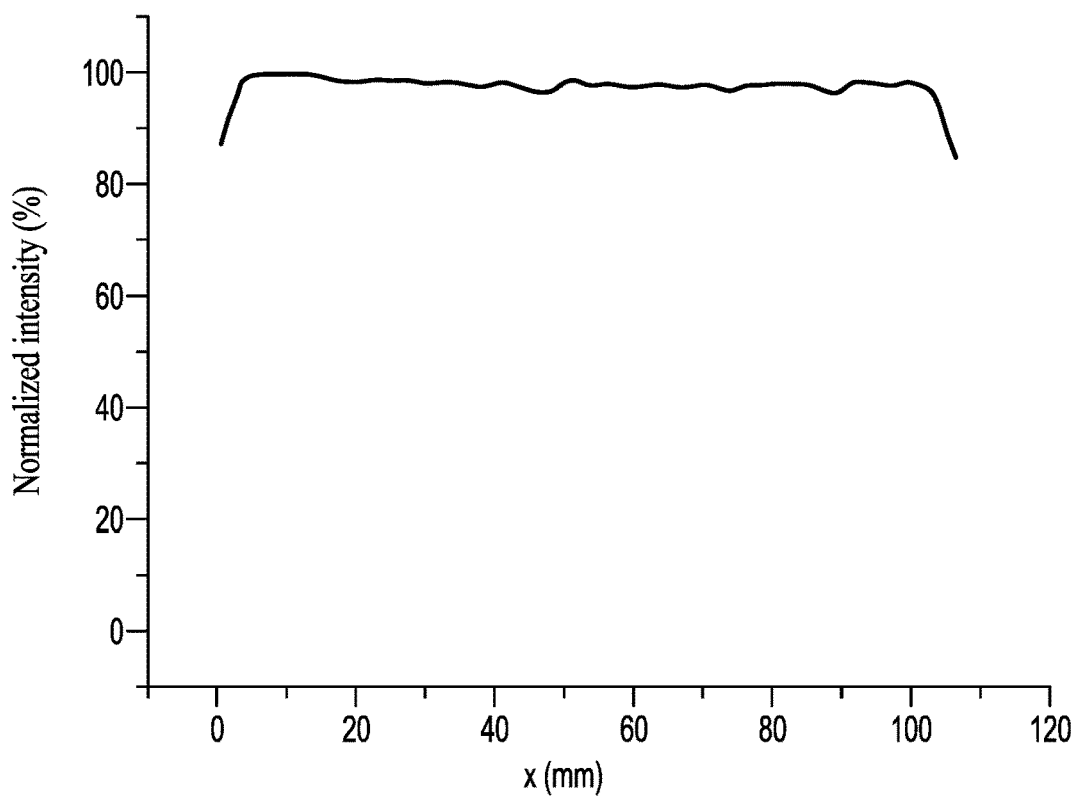

FIG. 21 and FIG. 22 are respectively a light intensity distribution diagram and a light extraction illuminance distribution diagram of a light guide plate according to a sixth embodiment of the disclosure. In the sixth embodiment, the design shown in FIG. 20 is adopted, where the relevant parameters of each microstructure are as shown in the following table.

| | |
|---|---|
| H2 | 6 μm |
| θ1 | 50° |
| θ2 | 50° |
| R | 10 μm |
| θ3 | 30° |
| θ4 | 30° |
| R' | 10 μm |
| θ3' | 30° |
| θ4' | 30° |
| α | 1 |
| Δx | 150 μm |
| Δy | 150 μm |

In the sixth embodiment, as shown in FIG. 21, the peak light intensity in the direction D1 (see the solid line) approaches ±40 degrees, and if deemed necessary, at least one prism sheet may be selectively configured to calibrate or eliminate the two peaks, or the use of the prism sheet may be omitted. On the other hand, the peak light intensity in the direction D2 (see the dashed line) is at the 0-degree angle, so that at least one prism sheet may be omitted as compared to the comparative example. In addition, according to FIG. 22, the light extraction efficiency provided in the sixth example is about 63.4%, and the light emitting uniformity is about 90.5%.

Figure 23:
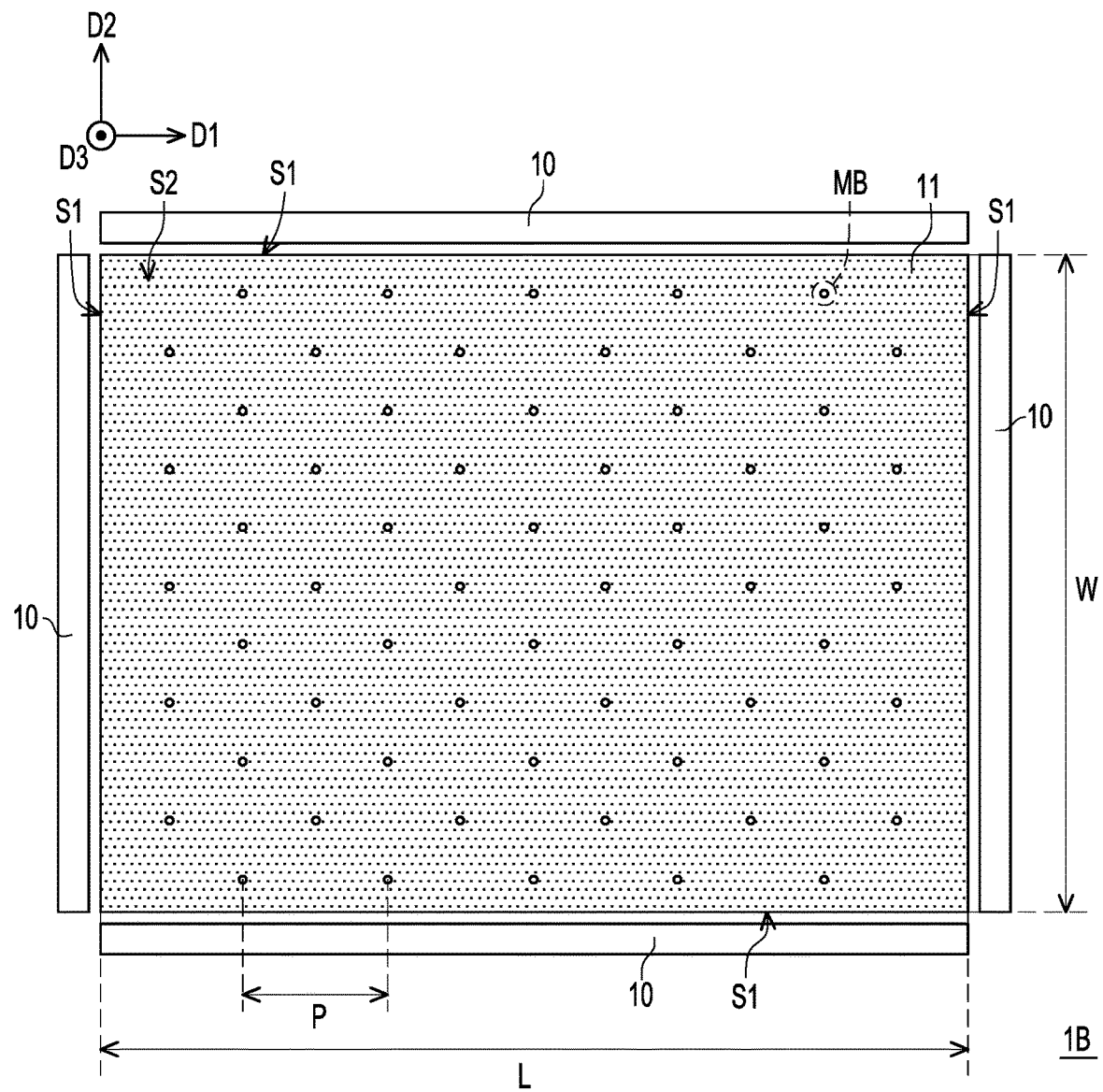
FIG. 23 is a schematic cross-sectional view and a schematic top view of a light source module according to yet another embodiment of the disclosure.
Figure 24:
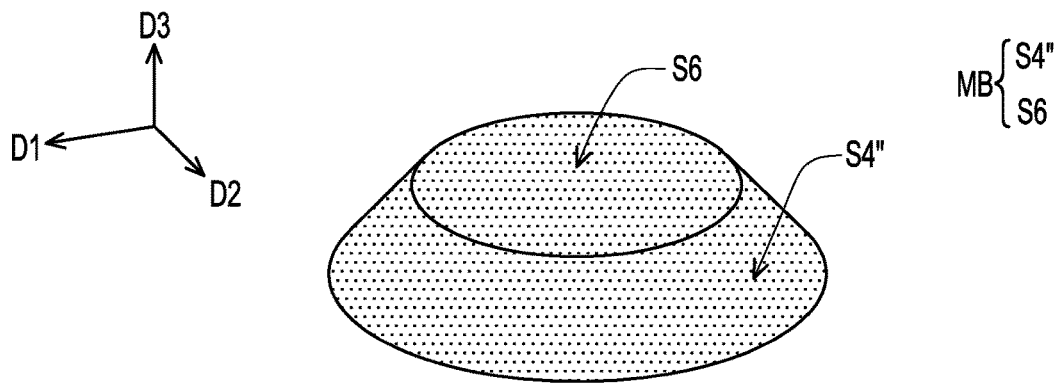
FIG. 24 is a schematic three-dimensional view of a microstructure according to yet another embodiment of the disclosure.

FIG. 23 is a schematic cross-sectional view and a schematic top view of a light source module according to yet another embodiment of the disclosure, where FIG. 23 omits the illustration of the reflection sheet and the optical films to clearly show the microstructures of the light guide plate. FIG. 24 is a schematic three-dimensional view of a microstructure according to yet another embodiment of the disclosure.

With reference to FIG. 23 and FIG. 24, in a light source module 1B, the light source 10 has a four-sided light entrance. The light guide plate 11 has four light entrance surfaces S1. Each microstructure MB further includes the connection surface S6, and the light-facing surface S4" may, for instance, surround the connection surface S6. In some embodiments, the connection surface S6 is, for instance, a flat surface, which should however not be construed as a limitation in the disclosure.

Figure 25A:
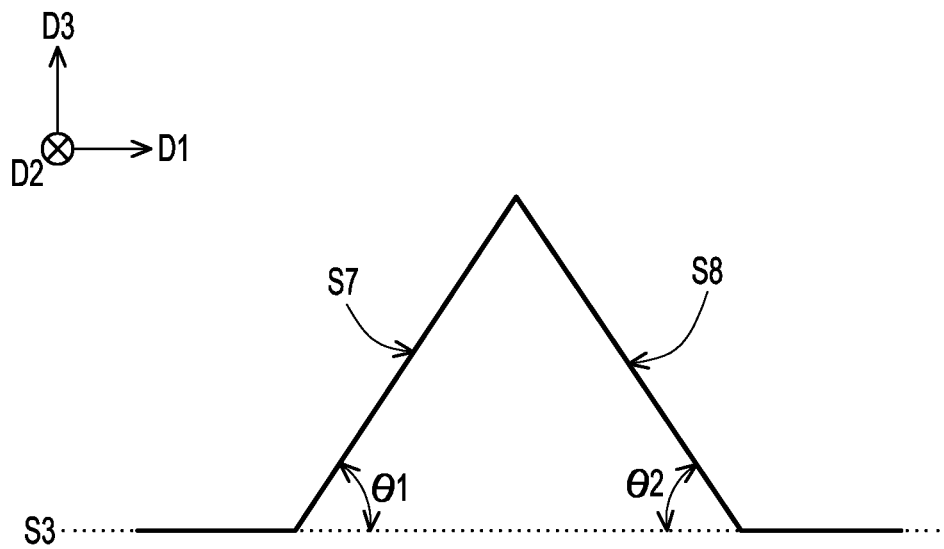
FIG. 25A to FIG. 25H are schematic cross-sectional views of a variety of microstructures according to other embodiments of the disclosure, respectively.
Figure 25B:
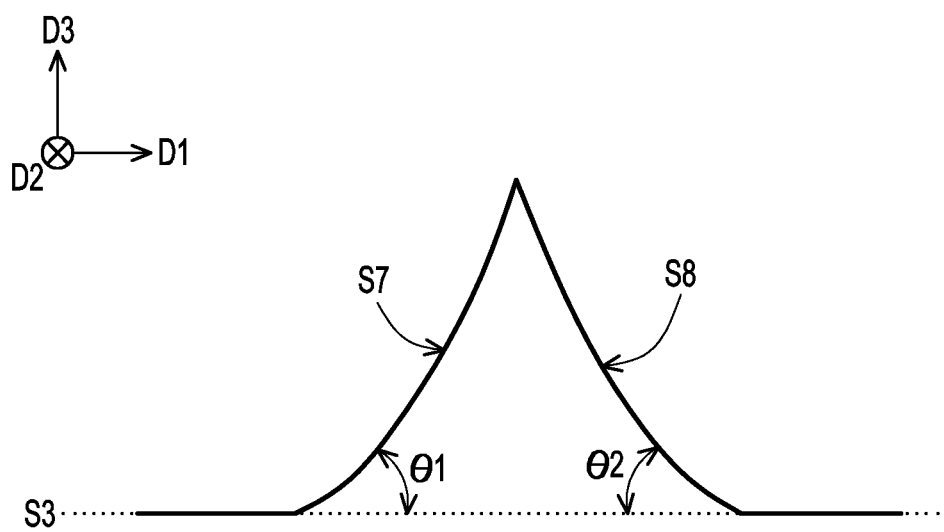
Figure 25C:
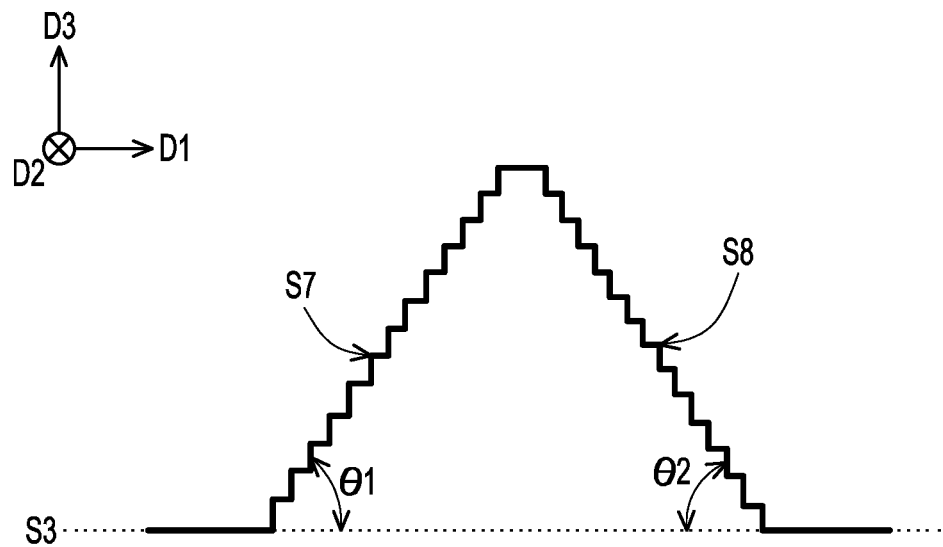

FIG. 25A to FIG. 25H are schematic cross-sectional views of a variety of microstructures according to other embodiments of the disclosure, respectively. In some embodiments, as shown in FIG. 25A to FIG. 25C, the microstructure may include surfaces S7 and S8, where the surface S8 is opposite to and connected to the surface S7. Given the structure of the single-sided light entrance, one of the surfaces S7 and S8 may be a light-facing surface, and the other one of the surfaces S7 and S8 may be a backlight surface. Given the structure of the double-sided light entrance, both surfaces S7 and S8 may be the light-facing surfaces. In response to different needs, the surface S7 may be a flat surface (see FIG. 25A), a curved surface (see FIG. 25B), a rough surface (see FIG. 25C), or a combination of the above, and the surface S8 may also be a flat surface (see FIG. 25A), a curved surface (see FIG. 25B), a rough surface (see FIG. 25C), or a combination of the above. Although FIG. 25A to FIG. 25C depict the surfaces S7 and S8 as the same type of surface, such as both being the flat surfaces (see FIG. 25A), both being the curved surfaces (see FIG. 25B), or both being the rough surfaces (see FIG. 25C), this should however not be construed as a limitation in the disclosure. In other embodiments, the surfaces S7 and S8 may be different types of surfaces.

Figure 25D:
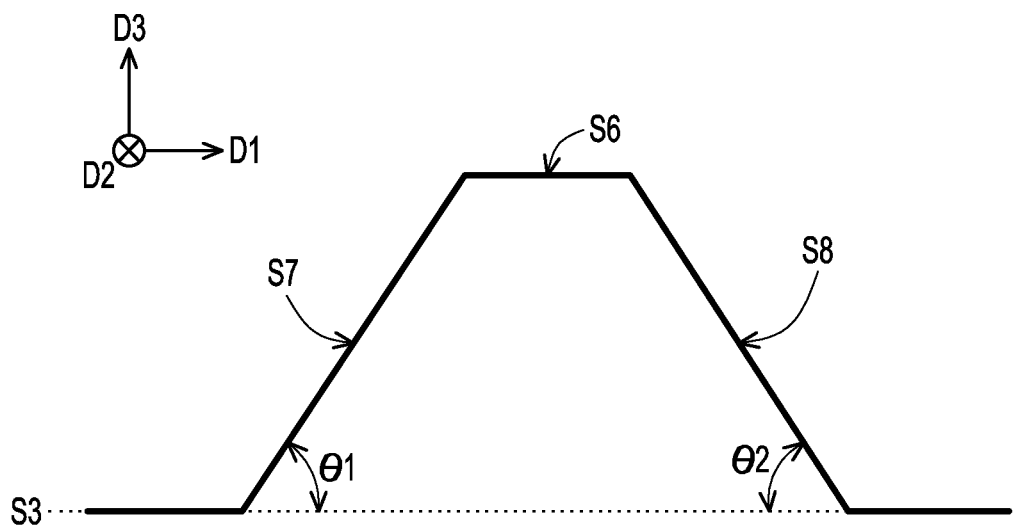
Figure 25E:
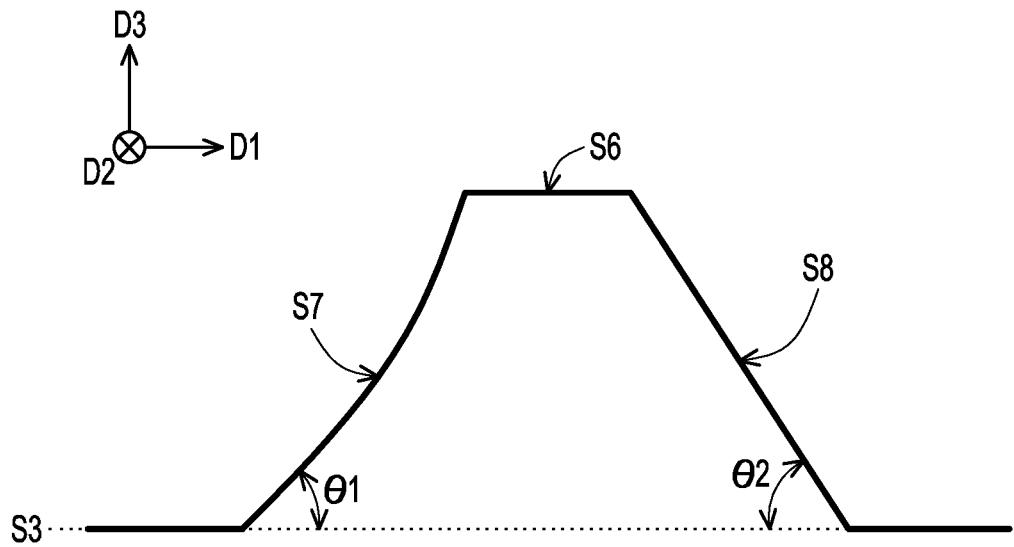
Figure 25F:
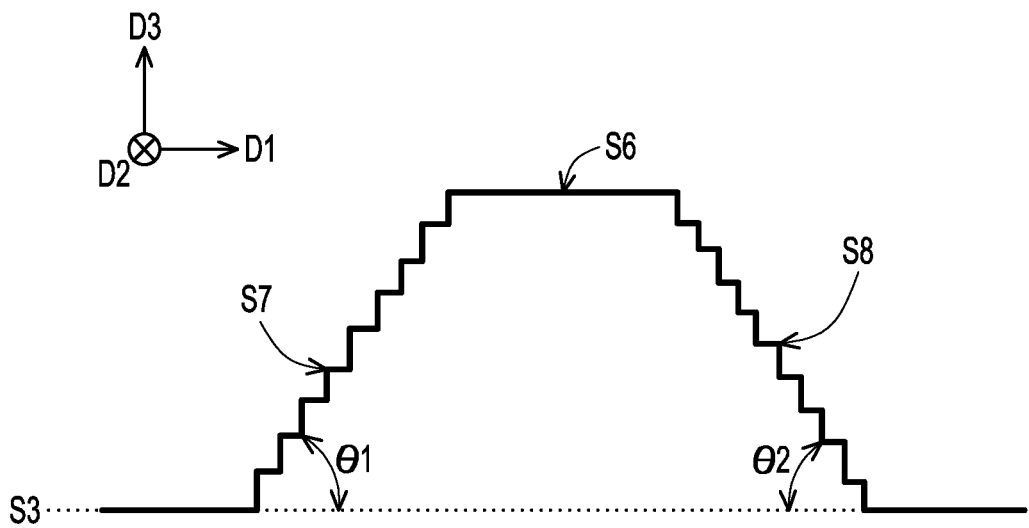
Figure 25G:
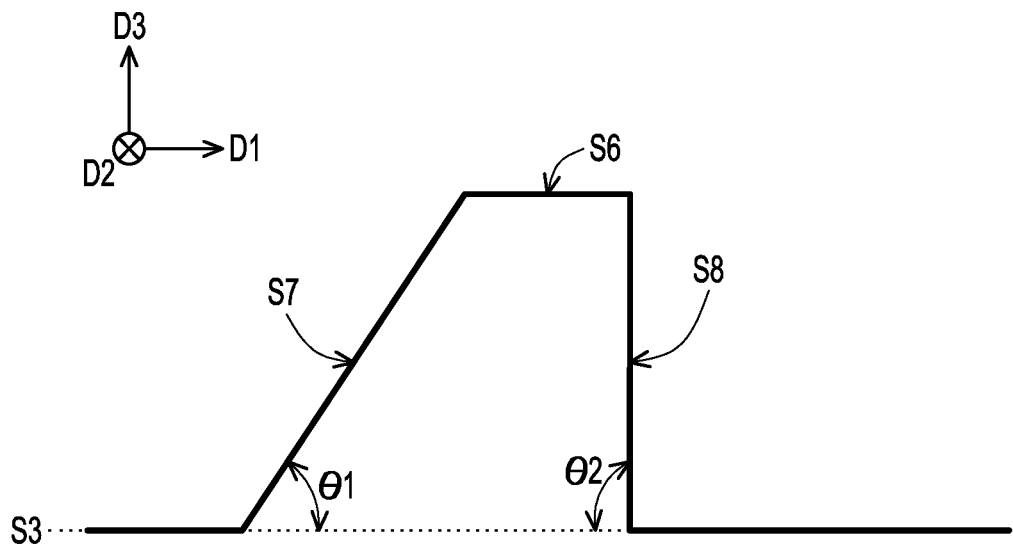
Figure 25H:
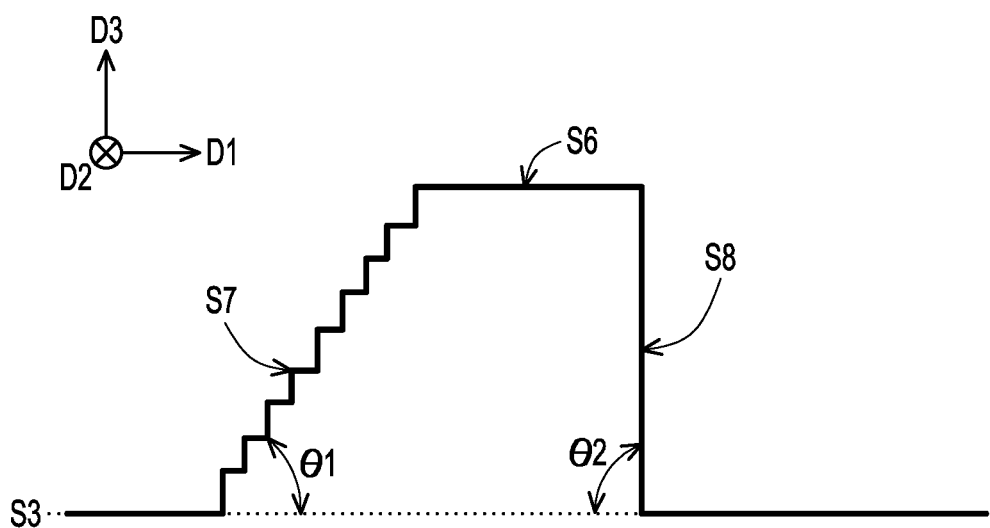

In some embodiments, as shown in FIG. 25D to FIG. 25F, the microstructure may further include the connection surface S6 that connects the surfaces S7 and S8, and the connection surface S6 may be, for instance, a flat surface. In some embodiments, as shown in FIG. 25A to FIG. 25F, the first included angle θ1 and the second included angle θ2 may be the same or similar. In other embodiments, as shown in FIG. 25G and FIG. 25H, the first included angle θ1 and the second included angle θ2 may be different.

In one or more embodiments of the disclosure, through the design of the ridge-shaped microstructures and the first included angle, the light may be directed toward the normal direction of the light guide plate and emitted, which may help reduce the overall number of prism sheets. By reducing the number of the prism sheets, light loss resulting from interface reflections and/or refractions between the optical films may be reduced, which is conducive to enhancement of the light extraction efficiency. By reducing the number of the optical films required by the light source module, the cost of the optical films and the carbon emissions of the light source module may be reduced. In addition, with the enhancement of the light extraction efficiency, the number of the light-emitting elements (such as the LEDs) in the light source may be reduced.

Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:

1. A light source module, comprising:
a light source; and
a light guide plate, having a light entrance surface, a light exit surface, and a bottom surface, wherein:
the light entrance surface faces the light source and is located between the light exit surface and the bottom surface,
the bottom surface is opposite to the light exit surface and has a plurality of microstructures,
the microstructures are a plurality of ridge-shaped microstructures formed in the light guide plate,
each of the microstructures comprises a light-facing surface, and a first included angle between the light-facing surface and the bottom surface is 30 degrees to 70 degrees, and wherein the light source module satisfies one of the following:
the light source has a single-sided light entrance, wherein an upper edge of the light-facing surface is an arc with a single radius of curvature, in a top view of the light source module, a third included angle exists between a connection line connecting a center of the arc and a first end of the arc and a normal direction of the light entrance surface, a fourth included angle exists between a connection line connecting the center and a second end of the arc and the normal direction, and the third included angle and the fourth included angle are 10 degrees to 50 degrees; or
the light source has a double-sided light entrance, and the light guide plate has two light entrance surfaces opposite to each other, wherein each of the of microstructures comprises two of the light-facing surfaces, each of the of microstructures further comprises a connection surface, and the two light-facing surfaces are respectively located on opposite sides of the connection surface and respectively face the two light entrance surfaces; or
the light source has a four-sided light entrance, and the light guide plate has four light entrance surfaces, wherein each of the microstructures further comprises a connection surface, and the light-facing surface surrounds the connection surface.

2. The light source module according to claim 1, wherein each of the microstructures further comprises a backlight surface opposite to the light-facing surface, and a second included angle between the backlight surface and the bottom surface is 40 degrees to 90 degrees.

3. The light source module according to claim 2, wherein the backlight surface is a flat surface, a curved surface, a rough surface, or a combination thereof.

4. The light source module according to claim 2, wherein each of the microstructures further comprises a connection surface connecting the light-facing surface and the backlight surface, and the connection surface is a flat surface.

5. The light source module according to claim 1, wherein the third included angle and the fourth included angle increase in a direction away from the light source.

6. The light source module according to claim 1, wherein the third included angle is equal to the fourth included angle.

7. The light source module according to claim 1, wherein an upper edge of each of the two light-facing surfaces is an arc with a single radius of curvature, in a top view of the light source module, a third included angle exists between a connection line connecting a center of the arc and a first end of the arc and a normal direction of the light entrance surface, a fourth included angle exists between a connection line connecting the center and a second end of the arc and the normal direction, and the third included angle and the fourth included angle are 10 degrees to 50 degrees.

8. The light source module according to claim 7, wherein the third included angle is equal to the fourth included angle.

9. The light source module according to claim 1, wherein the connection surface is a flat surface.

10. The light source module according to claim 1, wherein the connection surface is a flat surface.

11. The light source module according to claim 1, wherein pitches of the microstructures decrease in a direction away from the light source.

12. The light source module according to claim 1, wherein the microstructures are alternately arranged in an extension direction of the light source.

13. The light source module according to claim 1, wherein the light-facing surface is a flat surface, a curved surface, a rough surface, or a combination thereof.

14. The light source module according to claim 1, further comprising:
   a reflection sheet, disposed below the bottom surface.

15. The light source module according to claim 1, further comprising:
   a plurality of optical films, disposed above the light exit surface, wherein the number of prism sheets in the optical films is one.

16. The light source module according to claim 1, wherein a height of the microstructures is 3 μm to 15 μm.

* * * * *